US005642127A

United States Patent [19]

Tamai

[11] Patent Number: 5,642,127

[45] Date of Patent: Jun. 24, 1997

[54] DISPLAY DRIVER

[75] Inventor: Shigeki Tamai, Kashihara, Japan

[73] Assignee: Sharp Kabushiki Kaisha, Osaka, Japan

[21] Appl. No.: 471,444

[22] Filed: Jun. 6, 1995

[30] Foreign Application Priority Data

Aug. 12, 1994 [JP] Japan .................................... 6-190306

[51] Int. Cl.[6] ........................................ G06F 3/00

[52] U.S. Cl. ........................................ 345/95; 345/210

[58] Field of Search .............................. 345/89, 92, 99, 345/95, 100, 210, 211, 212

[56] References Cited

U.S. PATENT DOCUMENTS

| | | | |
|---|---|---|---|
| 5,200,846 | 4/1993 | Hiroki et al. | 345/92 |
| 5,227,790 | 7/1993 | Shin et al. | 345/100 |
| 5,229,761 | 7/1993 | Fuse | 345/99 |
| 5,453,757 | 9/1995 | Date et al. | 345/89 |

*Primary Examiner*—Mark R. Powell

[57] ABSTRACT

A liquid crystal driver IC drives a liquid crystal display apparatus by supplying the potential of one reference power source or the potentials of two reference power sources selected from among a plural number of reference power sources on the basis of the displayed data to the liquid crystal display apparatus by time sharing. The supply line of the reference power source for an intermediate value among the plurality of reference power sources is divided into at least two supply lines and the fixed directions of current flowing through the respective divided lines are maintained. The voltage-drop and voltage build-up of the reference power sources resulting from the electric charge flowing into and out of the reference power sources are limited to one of each of the two supply lines. The resulting voltage fluctuations of the reference power source are low, making it possible to supply the liquid crystal display apparatus with stable voltage required for the improvement of display definition.

20 Claims, 25 Drawing Sheets

DISPLAY DRIVER

BACKGROUND OF THE INVENTION

1. Field of the Invention

The present invention relates to a display driver for driving a display apparatus such as a liquid crystal display, etc., and in particular relates to improvement of a display driver constructed in a way to drive the display apparatus by supplying the display apparatus by time sharing with the potential of two reference power sources selected from among a plural number of reference power sources depending on the displayed data.

2. Description of the Related Art

Prior art will be explained below by taking the digital drive source driver of a liquid crystal display apparatus of Thin Film Transistor (hereinafter abbreviated as "TFT") type as an example.

FIG. 1 is a drawing showing a TFT liquid crystal display apparatus 11 and a gate driver integrated circuit (hereinafter abbreviated as "IC") 12 which is a driver thereof, and a source driver IC 13. Each picture element of the TFT liquid crystal display apparatus 11 consists of a TFT (Metal Oxide Semiconductor Field Effect Transistor, hereinafter abbreviated as "MOSFET") 111 and a liquid crystal element 112. The gate driver IC 12 outputs gate drive pulses G1, . . . , GM with phases shifted one after another. On the other hand, the source driver IC 13 (8-gradation display) outputs one selected potential or two selected potentials by time sharing from among the reference power sources V0, V4 and V7 (supplied from outside through terminals T0, T4 and T7 respectively) according to the display data D0, D1 and D2 input from a display controller (not shown) at the output terminals OT1, . . . , OTN.

FIG. 2 shows the internal construction of the source driver IC 13. The circuit of FIG. 2 represents a circuit corresponding to one of the output terminals OT1, . . . , OTN, and N similar circuits are provided in parallel inside the source driver IC 13.

D0, D1, D2 represent display data DM0, DM1, DM2 represent data memory circuits which fetch and store display data at the timing of clock signal SRi (i=1, . . . N). DL0, DL1, DL2 represent latch circuits which latch the output of the data memory circuits DM0, DM1, DM2, respectively, at the timing of clock signals LS, V0, V4, V7 represent reference power sources. L0, L4, L7 represent supply lines of reference power sources V0, V4, V7 respectively, AS0, AS4, AS7 represent analogue switches installed on the respective power supply lines. L0, L4, L7, DK represents a decoder circuit which outputs CAS0, CAS4, CAS7 controlling opening/closing of the analogue switches AS0, AS4, AS7 based on the output of display latch circuits DL0, DL1, DL2 and a clock signal CK (35 MHz) a Oi is an output. The clock signal SRi is a timing signal with a phase shifted one after another output from the shift register incorporated in the source driver IC 13.

Table 1 indicates the correspondence between the input display data D2, D1, D0 and the output signals CAS0, CAS4, CAS7 of the decoder circuit DK.

TABLE 1

| D2 | D1 | D0 | CAS0 | CAS4 | CAS7 |
|---|---|---|---|---|---|
| 0 | 0 | 0 | 1 | | |
| 0 | 0 | 1 | 3t | $\overline{3t}$ | |
| 0 | 1 | 0 | 2t | $\overline{2t}$ | |
| 0 | 1 | 1 | 1t | $\overline{1t}$ | |
| 1 | 0 | 0 | | 1 | |
| 1 | 0 | 1 | | 3t | $\overline{3t}$ |
| 1 | 1 | 0 | | 2t | $\overline{2t}$ |
| 1 | 1 | 1 | | | 1 |

The blank parts in the table are all "0".

FIG. 3 shows the waveform of the clock signal CK and of the decoder circuit output signals 1t–3t and 1 given in Table 1.

FIG. 4 shows an example of construction of the decoder circuit DK. This circuit is composed of 2-step D type flip-flops DF1, DF2 constituting the dividing circuit of the clock signal CK and a logical gate LG which generates and outputs analogue switch control signals CAS0, CAS4, CAS7 given in Table 1 based on the output of the flip-flops and the display data.

Moreover, FIG. 5 shows an example of construction of analogue switches AS0, etc. In the example of FIG. 5, each switch includes a CMOS transfer gate, but it may also include a transfer gate composed only of a MOS transistor of one channel which does not produce any voltage drop of threshold value. For example, the analogue switches AS0, AS4 may be constructed respectively with a MOS transistor of N channel only. Moreover, the analogue switches AS4, AS7 may be constructed respectively with a MOS transistor of P channel only by reversing the output of the decoder circuit.

Next, the operation of the circuit of FIG. 2 will be described based on the timing chart of FIG. 6.

As shown in FIG. 6, when the clock signal SRi controlling the data memory circuits DM0, DM1, DM2 is at the high level, the 3-bit display data D0, D1, D2 are taken into the data memory circuits concerned, and then they are output directly from the output Q and led to the display latch circuits DL0, DL1, DL2. When the clock signal SRi has fallen from high level to low level, the data memory circuits DM0–DM2 maintain the values of D0 to D2 and, during the period when the clock signal SRi remains at the low level, the output Q of the data memory circuits DM0–DM2 does not change even if there is some change in the input display data D0 to D2. Next, when the clock signal LS controlling the display latch circuits DL0–DL2 is at the high level, the output Q of the data memory circuits DM0–DM2 is led directly to the output Q of the display latch circuits DL0–DL2. When the signal LS has fallen from high level to low level, the data of the output Q of the data memory circuits DMO–DM2 at that point in time is retained in the output Q of the display latch circuits DL0–DL2. Moreover, during the period when the signal LS is at the low level, the output Q of the display latch circuits DL0–DL2 does not change even if there is some change in the output Q of the data memory circuits DM0–DM2. The output Q of the display latch circuits DL0–DL2 is led to the input of the decoder circuit DK. The decoder circuit DK outputs analogue switch control signals CAS0, CAS4, CAS7 as shown in Table 1. For example, when the display data D2, D1, D0 are "000", the decoder circuit DK outputs a signal with which only the analogue switch AS0 is turned on. Thereby, the potential of the reference power source V0 is output to the output Oi and then fed to the liquid crystal display apparatus. Moreover, when the display data D2, D1, D0 are "011", the decoder circuit DK outputs a signal with which the analogue switch AS0 is turned on for a quarter period, the analogue switch AS4 is turned on for the following 3 quarter periods by turning off the analogue switch AS0, and these operations are alternately repeated. As a result, the potential of the reference power source V0 and the potential of the reference power source V4 are alternately output to the output Oi in the proportion of time of 1:3 and are fed to the TFT liquid crystal display apparatus 11.

FIG. 2 shows one output unit of a drive circuit which feeds 3 levels of reference supply voltage as display signals to the TFT liquid crystal display apparatus 11. For example, he number of output terminals of the source driver IC 13 of a TFT liquid crystal display apparatus 11 is 120 to 240 or so, and this number is expected to further increase in the future. Moreover, considering the purpose of the use of a digital drive source driver, a liquid crystal display of office automation (hereinafter abbreviated as "OA") equipment can be imagined naturally, and it is expected that a rectangular display (e.g., window display) will be more commonly used for the display image of such a liquid crystal display. Considering the output value of horizontal period of the digital drive source driver driving the liquid crystal display in the case of such a rectangular display, for example, in the case where the outputs of No. 1 output terminal OT1 to No. n output terminal OTn are a background picture with a voltage level of V6, the outputs of No. n+1 output terminal OTn+1 to No. n+100 output terminal OTn+100 are a window display with a voltage level of V1 and that the output of No. n+101 output terminal OTn+101 to final output terminal OTN displays a background picture with a voltage level of V6, for example, the levels of the reference power source V7 and the reference power source V4 in a period 1 produce a voltage drop because the current i flows from the reference power sources to the load as shown in FIGS. 7 and 8. Next, as shown in FIGS. 7 and 9, the current i flows into the load in a period 2 continuously from the period 1, and the level of the reference power source V7 in the period 2 produces a further voltage drop. On the other hand, the electric charge which has flowed from the reference power source V4 to the load flows next to the reference power source V0, causing a voltage build-up in the level of the reference power source V0. Lastly, as shown in FIGS. 7 and 10, in a period 3, the electric charge which has flowed from the reference power source V7 to the load flows to the reference power source V4 while the electric charge which has flowed from the reference power source V4 to the load flows to the reference power source V0, and this causes a voltage build-up in the levels of the reference power source V4 and the reference power source V0.

Accordingly, when an intermediate voltage is produced by turning on/off between two reference power sources, there is good reason to believe that voltage fluctuations in the reference power sources themselves make it difficult to supply a stable voltage to the display apparatus, leading to a drop of display definition, if the reference power sources repeats voltage-drop and voltage build-up as the reference power source V4 does.

SUMMARY OF THE INVENTION

Hence an object of the invention is to solve the above-mentioned problems of the prior art.

A fixed direction of the current flowing to each supply line is maintained by a pattern layout with no less than two supply lines (metal lines, etc.) for one reference power source. There is no need to divide the reference power source line producing the maximum and the minimum voltage value of the reference power source into no less than two lines because the current direction is fixed.

Namely, the invention provides an improved display driver having a constitution in which the potentials of two reference power sources selected from among a plurality of reference power sources on the basis of displayed data are supplied to a display apparatus by time sharing and a supply line for an intermediate value reference power source among the plurality of reference power sources is divided into two to maintain the fixed directions of the current flowing through the divided supply lines.

With a constitution as described above, the directions of the current flowing through the divided reference power source supply lines become fixed and the voltage-drop and voltage build-up of the reference power sources resulting from the electric charge flowing into and out of the reference power sources are limited to either of the two, thus suppressing voltage fluctuations of the reference power sources low. That makes it possible to realize stable voltage supply required for the improvement of display definition.

According to the invention,it becomes possible to suppress fluctuations of the reference power source voltages low and feed stable outputs to a display apparatus, thus enabling improvement of display definition.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
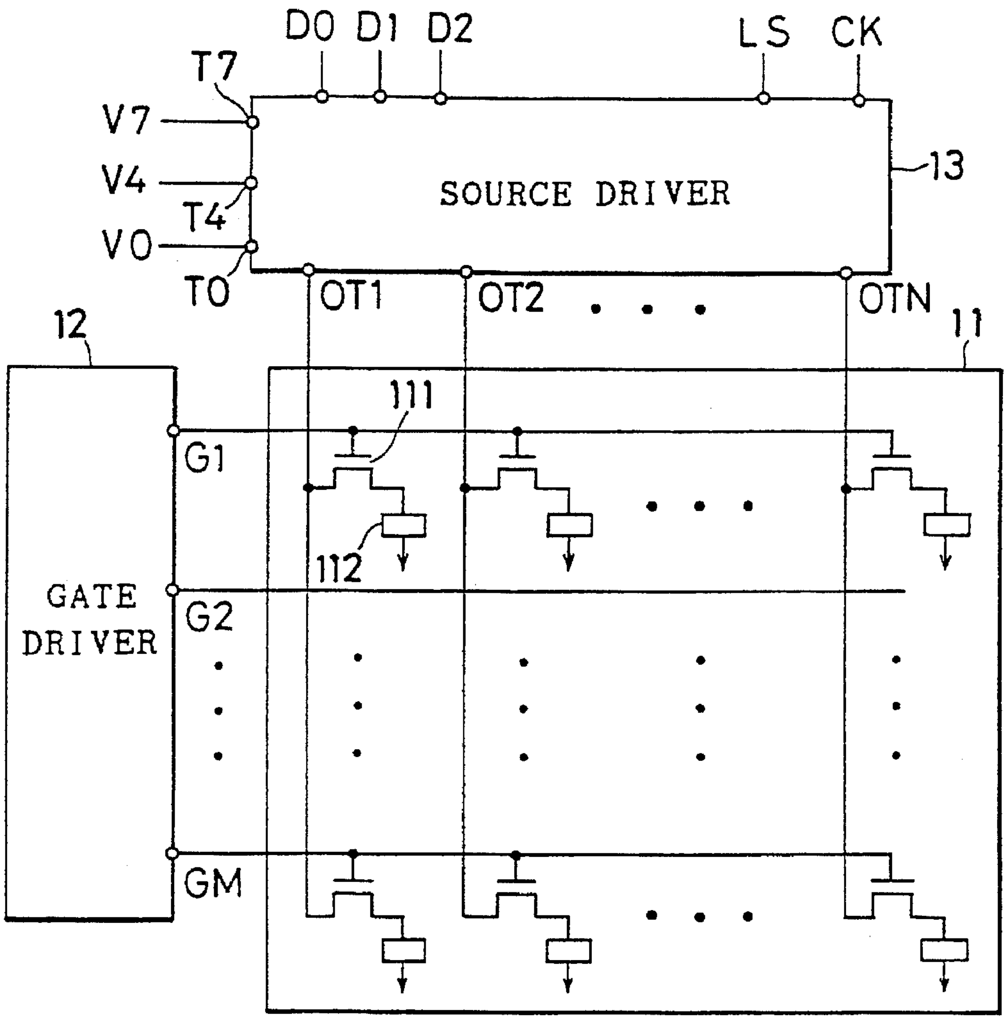
FIG. 1 PRIOR ART
FIG. 1 is a constitution drawing of a TFT liquid crystal display system.
Figure 2:
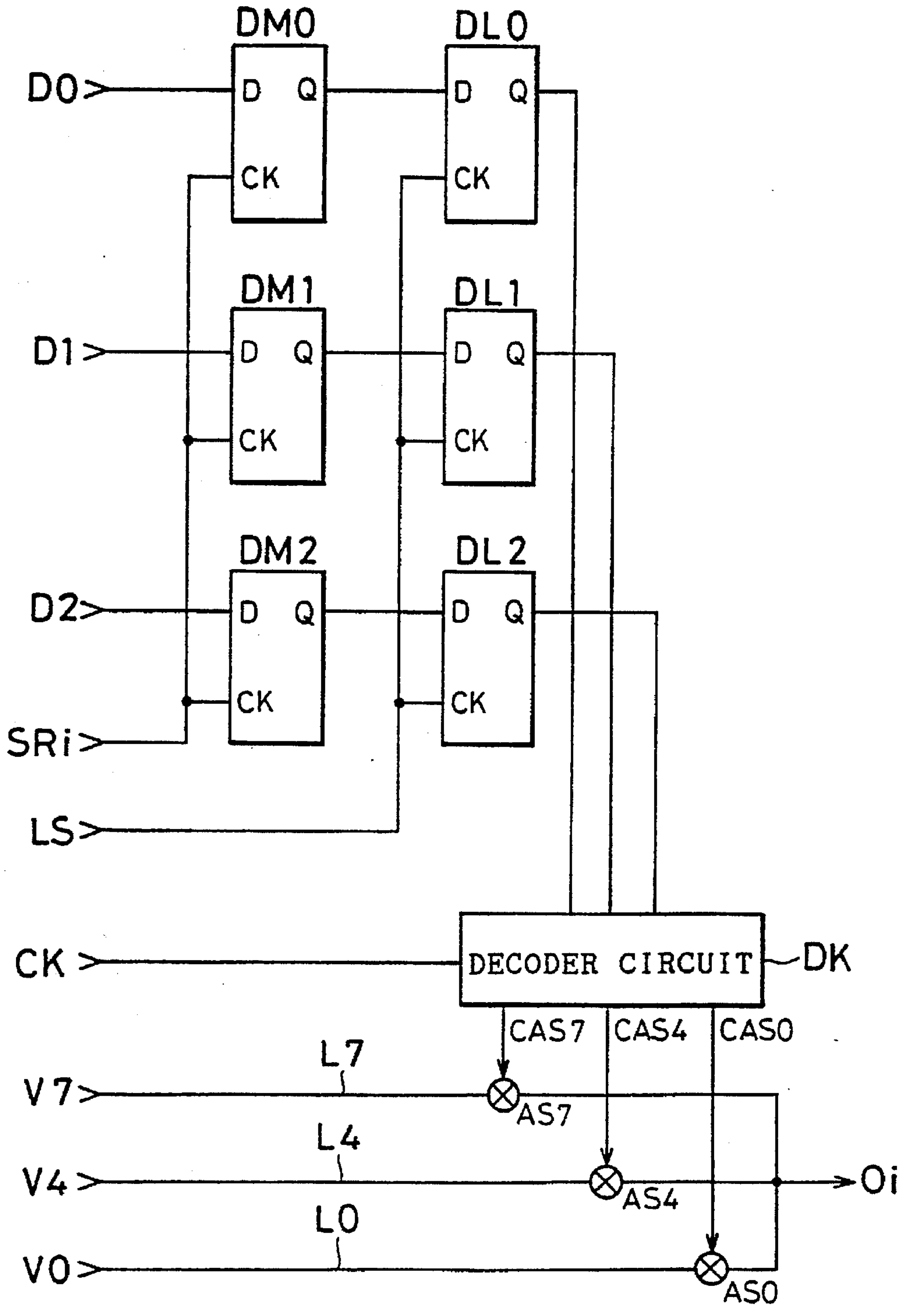
FIG. 2 PRIOR ART
FIG. 2 is an internal constitution drawing of a conventional source driver.

Now referring to the drawings, preferred embodiments of the invention are described below.

An embodiment of the present invention implemented in the digital drive source driver of a TFT liquid crystal display will be described in detail hereafter.

Figure 11:
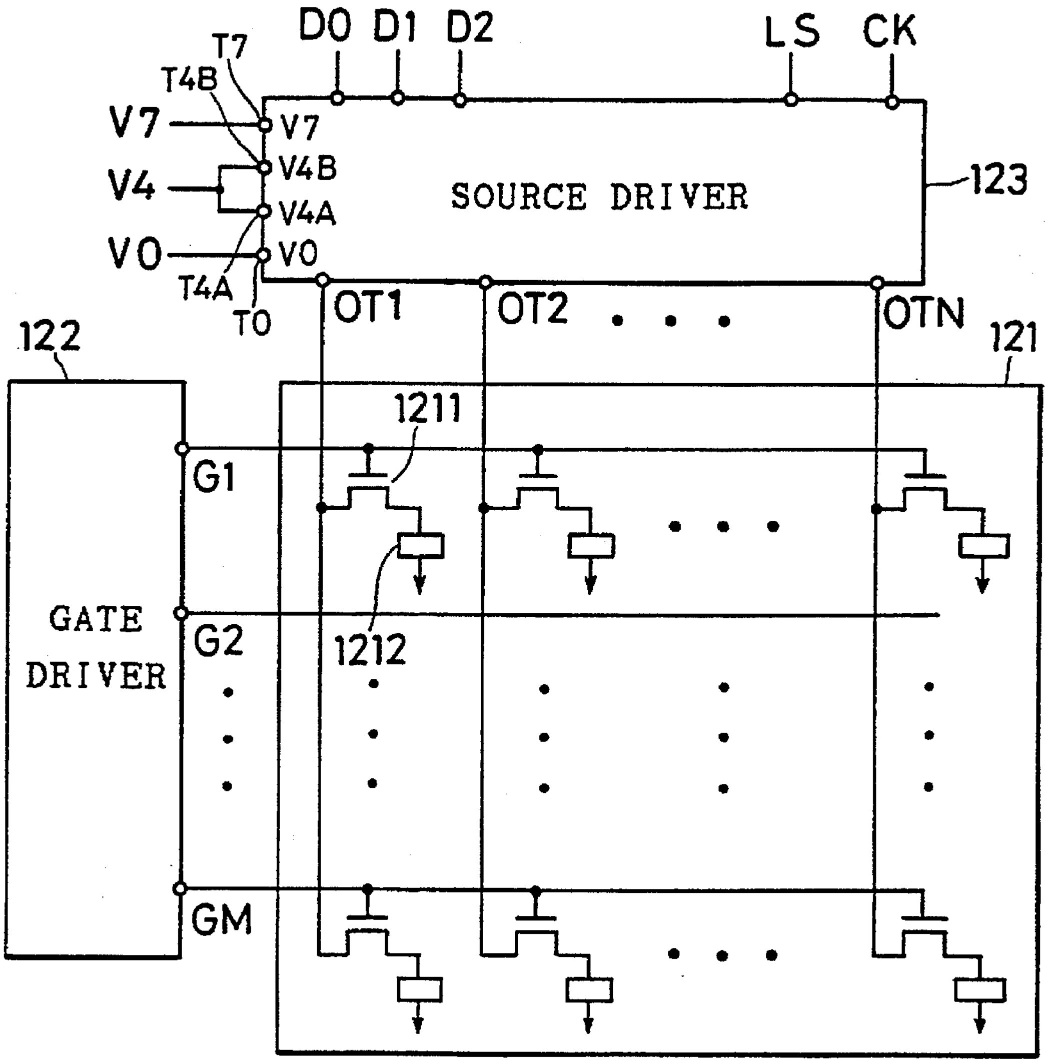
FIG. 11 is a constitution drawing of a TFT liquid crystal display system according to the invention.

FIG. 11 is a drawing showing a TFT liquid crystal display apparatus 121 and a gate driver IC 122 which is the drive system thereof, as well as a source driver IC 123 which is an embodiment of the invention. In the drawing, the system is constituted in such a way that the TFT liquid crystal display apparatus 121 is driven by a single gate driver IC 122 and a single source driver IC 123, but the TFT liquid crystal display apparatus 121 may also be driven by a plurality of gate driver ICs and source driver ICs.

Each picture element of the TFT liquid crystal display apparatus 121 consists of a TFT (MOSFET) 1211 and a liquid crystal element 1212. The gate driver IC 122 outputs gate drive pulses G1, . . . , GM with phases shifted one after another. On the other hand, the source driver IC 123 (8-gradation display) outputs one selected potential or two selected potentials by time sharing from among the reference power sources V0, V4A (=V4), V4B (=V4A=V4) and V7 (supplied from outside through terminals T0, T4A, T4B, and T7, respectively) according to the display data D0, D1 and D2 input from a display controller (not shown) at the output terminals OT1, . . . , OTN.

Figure 12:
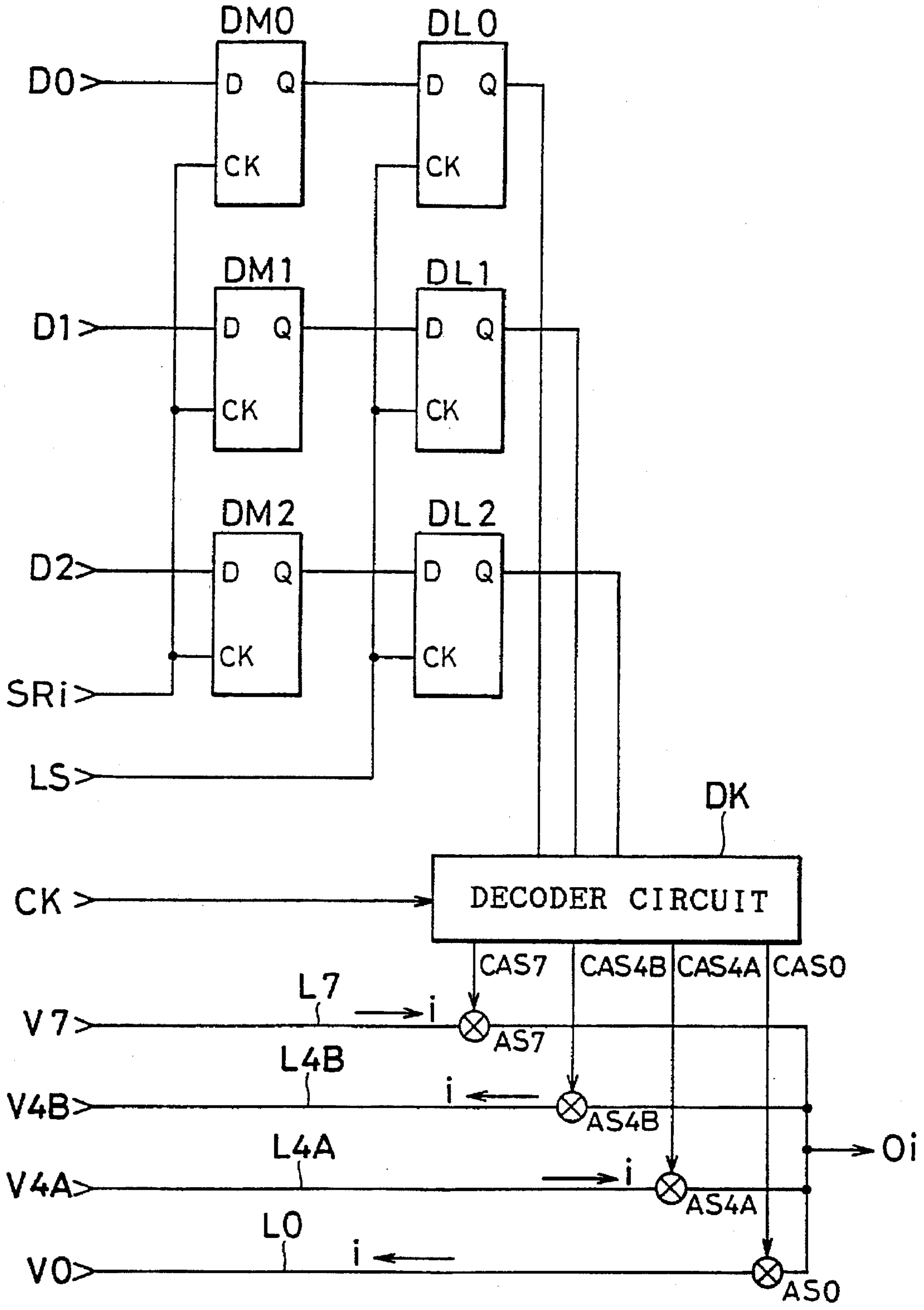
FIG. 12 is an internal constitution drawing of the source driver of an embodiment of the invention.

FIG. 12 shows an internal constitution of the source driver IC 123 which is an embodiment of the invention. The circuit of FIG. 12 represents the portion corresponding to one output terminal, and N pieces of similar circuits are provided in parallel inside the source driver IC 123.

The source driver IC 123 is different from the conventional circuit in the constitution of the decoder circuit DK and in that the intermediate power supply line is divided into two lines (L4A, L4B) which are provided with analogue switches AS4A and AS4B, respectively. Namely, the decoder circuit DK is improved to maintain the direction of the current constant by dividing the line of the reference power source V4 the current direction of which is not fixed into a plurality of lines, such as the reference power source V4A in the case of a gradation voltage produced by alternate turning on/off of the reference power source V0 and reference power source V4, and the reference power source V4B in the case of a gradation voltage produced by alternate turning on/off of the reference power source V4 and reference power source V7, etc.

Reference numerals D0, D1, D2 designate display data (3 bits), memory circuits DM0, DM1, and DM2 fetch and store the display data D0, D1, D2 at the timing of clock signal SRi (i=1, .. N), Display latch circuits DL0, DL1, DL2 latch the output of the data memory circuits DM0, DM1, DM2 at the timing of clock signal LS. Reference numerals V0, V4A, V4B, V7 designate reference power sources, reference numerals L0, L4A, L4B, L7 are supply lines of reference power sources V0, V4A, V4B, V7, respectively. Analogue switches are installed on the respective power supply lines V0, V4A, V4B, AS0, AS4A, AS4B, AS7, V7. A decoder circuit DK outputs signals CAS0, CAS4A, CAS4B, CAS7 controlling opening/closing of the analogue switches AS0, AS4A, AS4B, AS7 based on the output of the display latch circuits DL0, DL1, DL2 and a clock signal CK (35 MHz), and a reference numeral Oi designates an output. The clock signal SRi is a timing signal with phases shifted one after another output from the shift register incorporated in the source driver IC 123.

Table 2 indicates the correspondence between the input display data D2, D1, D0 and the output signals CAS0, CAS4A, CAS4B, CAS7 of the decoder circuit DK.

TABLE 2

| D2 | D1 | D0 | CAS0 | CAS4A | CAS4B | CAS7 |
|---|---|---|---|---|---|---|
| 0 | 0 | 0 | 1 | | | |
| 0 | 0 | 1 | 3t | $\overline{3t}$ | | |
| 0 | 1 | 0 | 2t | $\overline{2t}$ | | |
| 0 | 1 | 1 | 1t | $\overline{1t}$ | | |
| 1 | 0 | 0 | | 1 | | |
| 1 | 0 | 1 | | | 3t | $\overline{3t}$ |
| 1 | 1 | 0 | | | 2t | $\overline{2t}$ |
| 1 | 1 | 1 | | | | 1 |

The blank parts are all "0".

Figure 3:
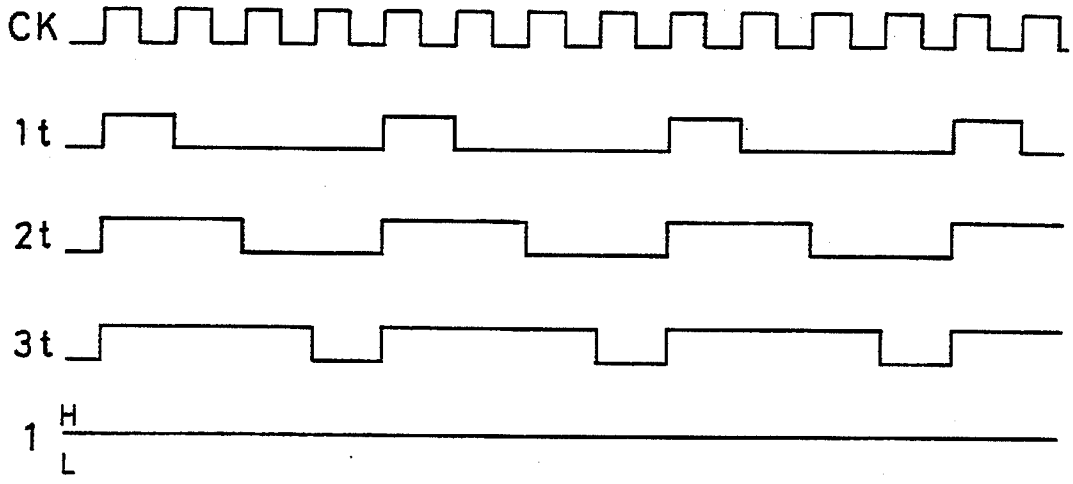
FIG. 3 PRIOR ART
FIG. 3 shows signal waveforms for explaining a decoder circuit.

The waveforms of signals 1t, 2t, 3t, 1 of the decoder circuit output are the same as those of FIG. 3.

Figure 13:
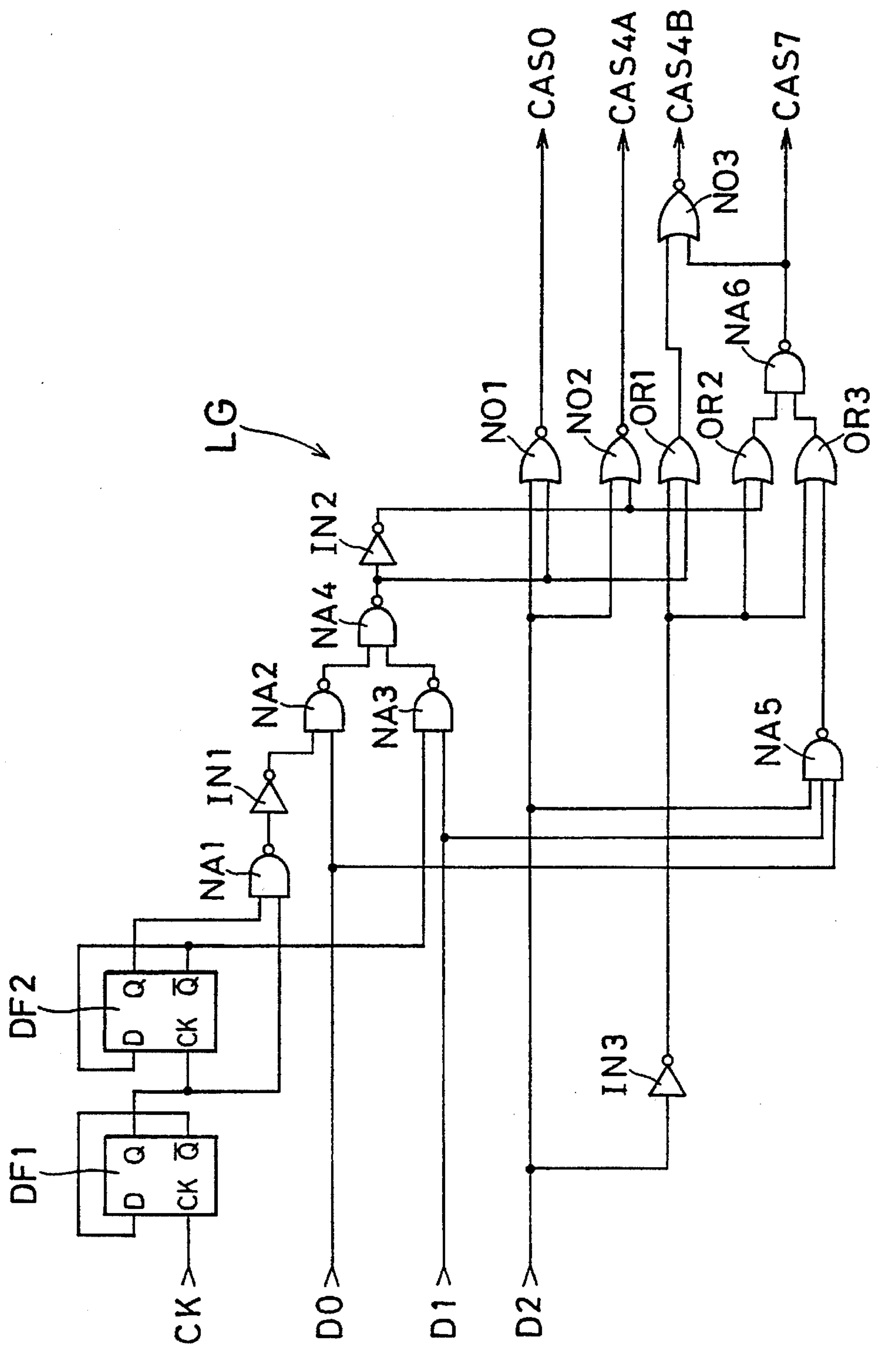
FIG. 13 is an internal constitution drawing of a decoder circuit shown in FIG. 12.
Figure 14:
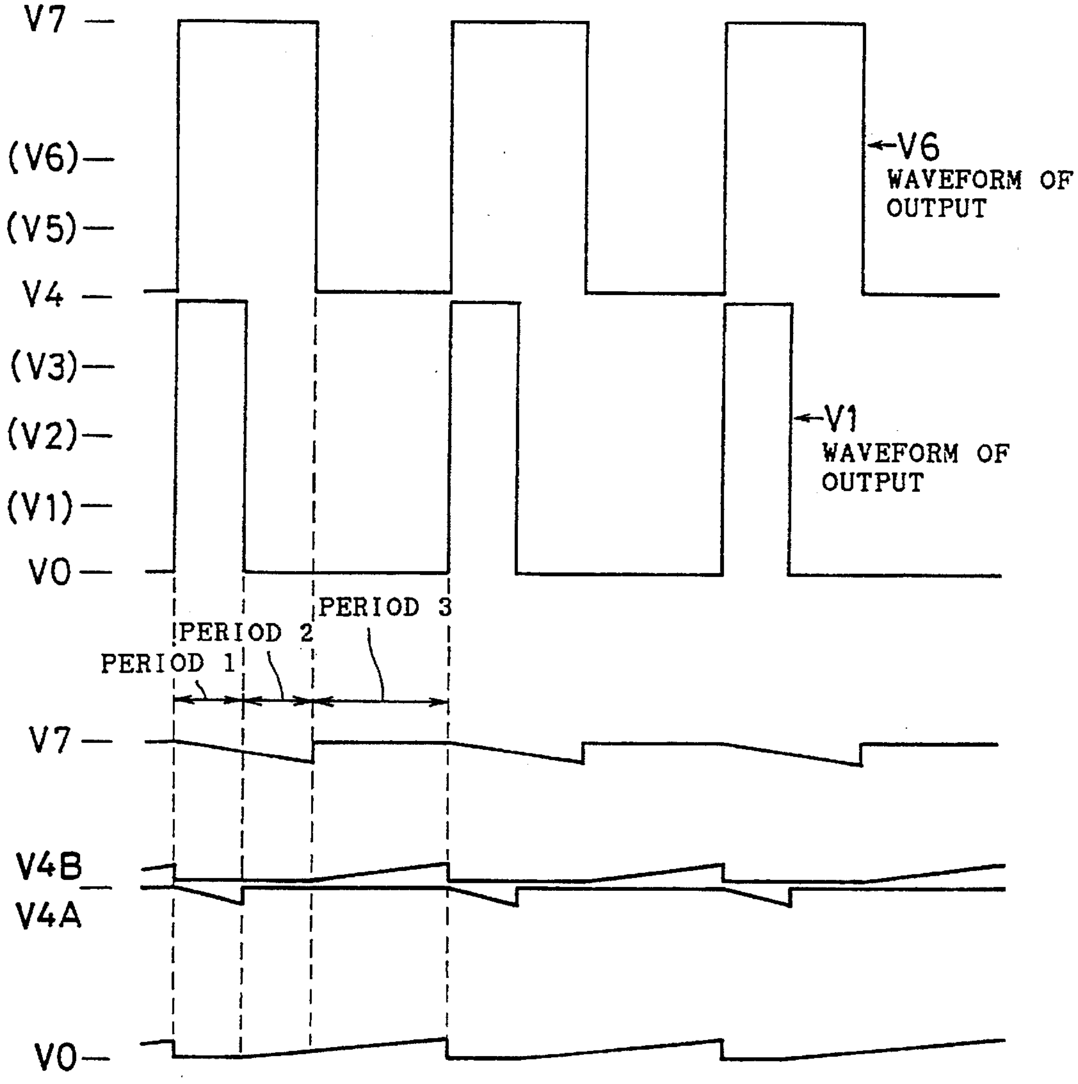
FIG. 14 is a drawing showing voltage fluctuations of reference power sources in the source driver of the embodiment of the invention of FIG. 12.
Figure 15:
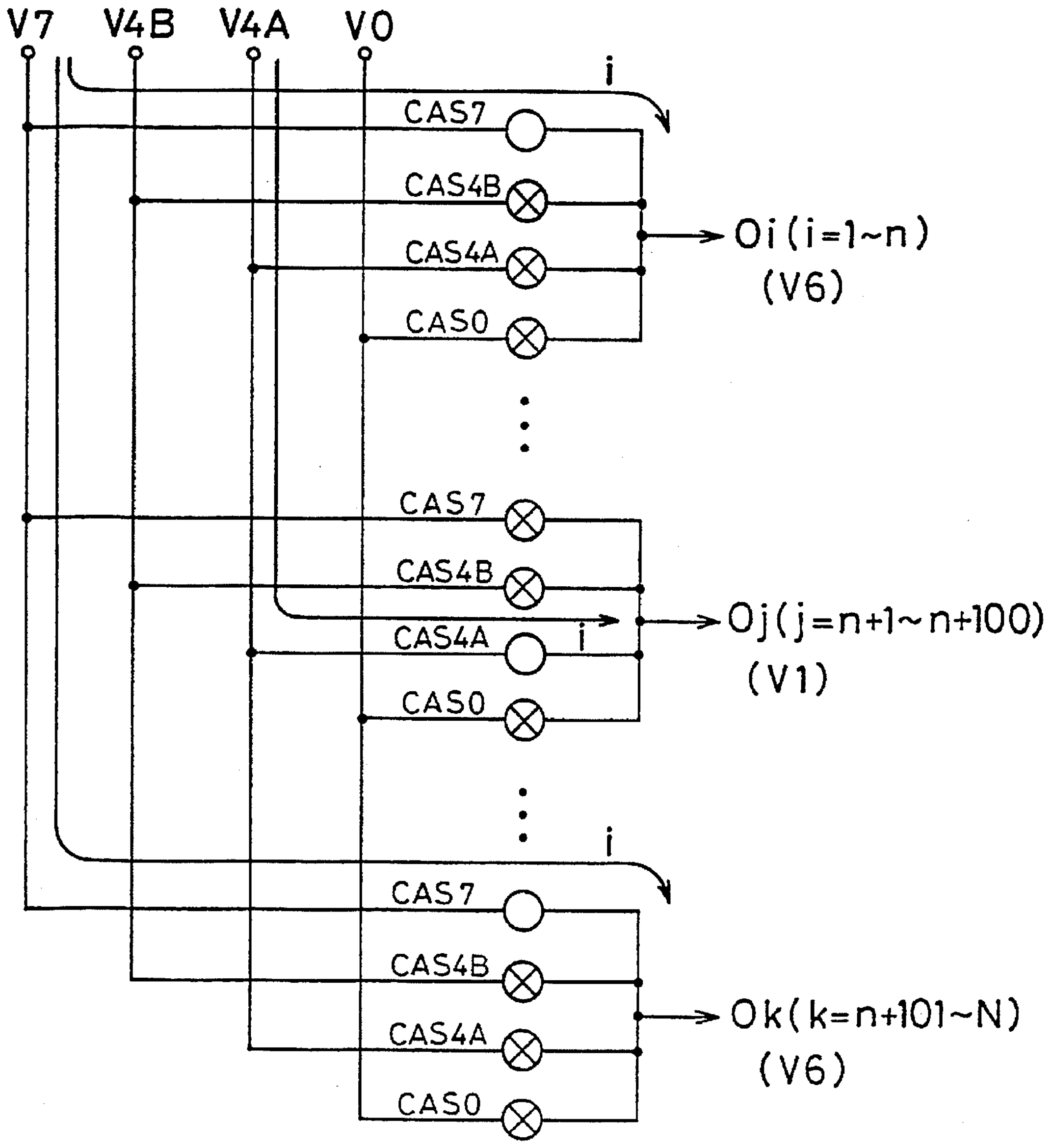
FIG. 15 is a state drawing in a period 1 shown in FIG. 14.
Figure 16:
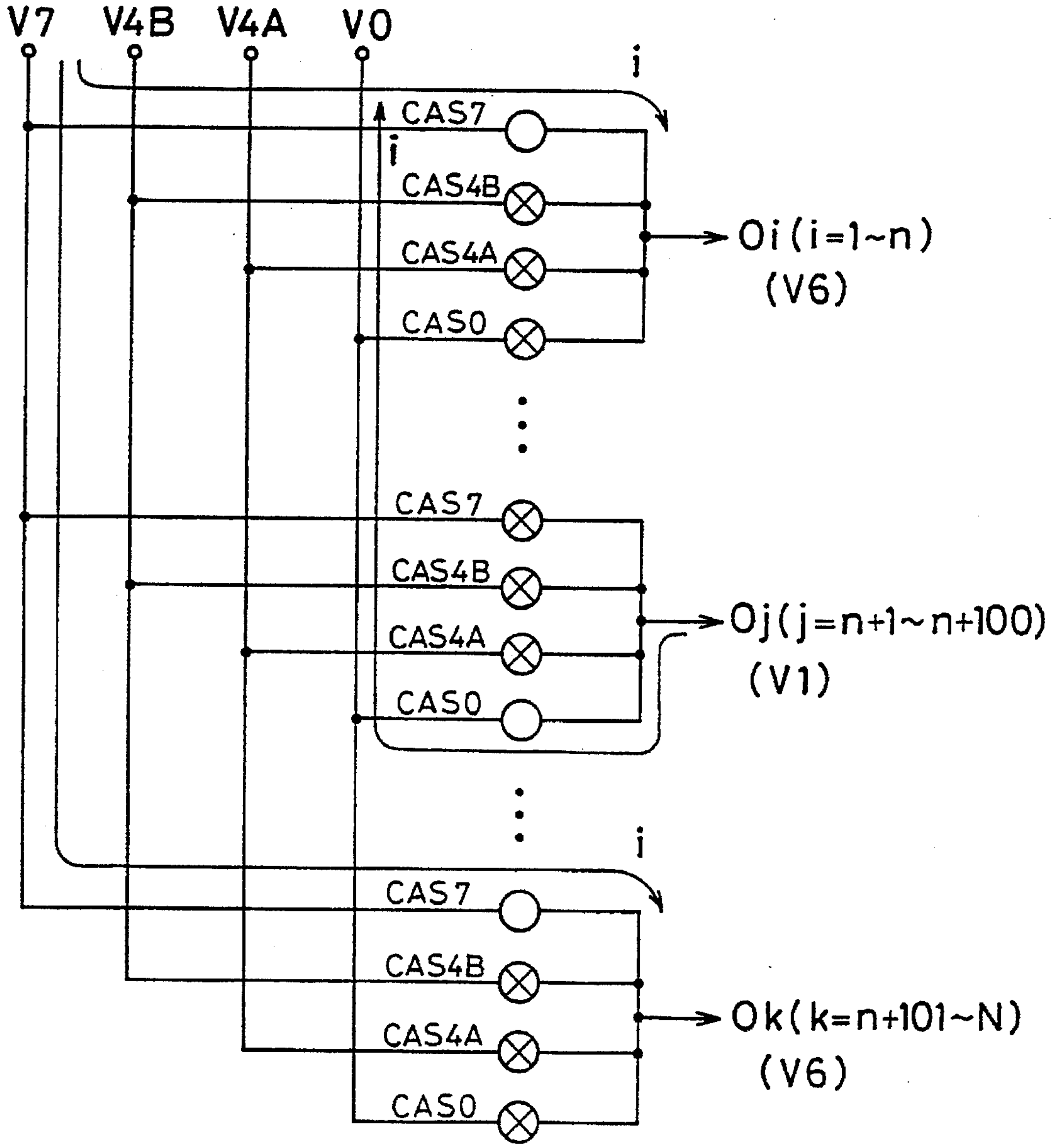
FIG. 16 is a state drawing in a period 2 shown in FIG. 14.
Figure 17:
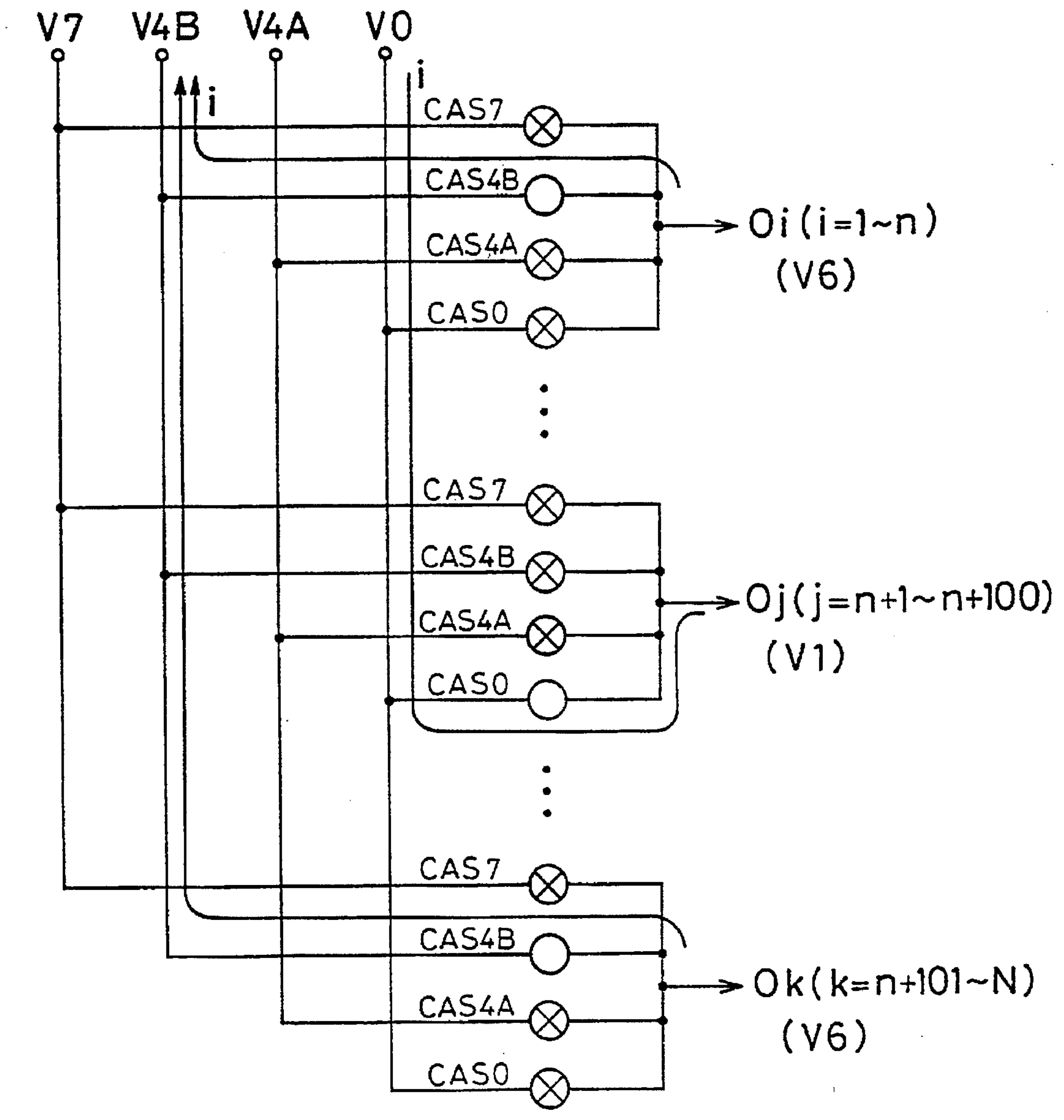
FIG. 17 is a state drawing in a period 3 shown in FIG. 14.

FIG. 13 indicates an example of constitution of the decoder circuit DK. This circuit is composed of 2-step D type flip-flops DF1, DF2 constituting the dividing circuit of the clock signal CK and a logical gate LG which generates and outputs analogue switch control signals CAS0, CAS4A, CAS4B, CAS7 given in Table 2 based on the outputs of the flip-flops and the display data D0, D1, D2. The logic gate LG is composed of NAND circuits NA1 to NA6, NOR circuits NO1 to NO3, OR circuits OR1 to OR3 and inverter circuits IN1 to IN3. The NAND circuit NA1 inputs the outputs Q of the flip-flops DF1, DF2, respectively, and outputs to the inverter circuit IN1. The NAND circuit NA2 inputs the output of the inverter circuit IN1 and the display data D0 and outputs to the NAND circuit NA4. The NAND circuit NA3 inputs the output Q of the flip-flop DF2 and the display data D1 and outputs to the NAND circuit NA4. The NAND circuit NA4 inputs the outputs of NAND circuits NA2, NA3, respectively, and outputs to the inverter circuit IN2, NOR circuit NO1 and OR circuit OR1.

The inverter circuit IN3 inputs the display data D2 and outputs to OR circuits OR1, OR2, OR3. The inverter circuit IN2 inputs the output of the NAND circuit NA4 and outputs to the NOR circuit NO2 and the OR circuit OR2.

The NOR circuit NO2 inputs the output of the inverter circuit IN2 and the display data D2 and generates analogue switch control signal CAS4A.

The OR circuit OR2 inputs the outputs of inverter circuits IN2, IN3, respectively, and outputs to the NAND circuit NA6. The NOR circuit NO1 inputs the output of the NAND circuit NA4 and the display data D2 and generates analogue switch control signal CAS0. The OR circuit OR1 inputs the output of the NAND circuit NA4 and the output of the inverter circuit IN3 and outputs to the NOR circuit NO3.

The NAND circuit NA5 inputs the display data D0, D1, D2 and outputs to the OR circuit OR3.

The OR circuit OR3 inputs the output of the NAND circuit NA5 and the output of the inverter circuit IN3 and outputs them in the NAND circuit NA6. The NAND circuit NA6 inputs the outputs of OR circuits OR2, OR3, respectively, and generates the analogue switch control signal CAS7 and outputs to the NOR circuit NO3. The NOR circuit NO3 inputs the output of the OR Circuit OR1 and the output of the NAND circuit NA6 and generates analogue switch control signal CAS4B.

Figure 5:
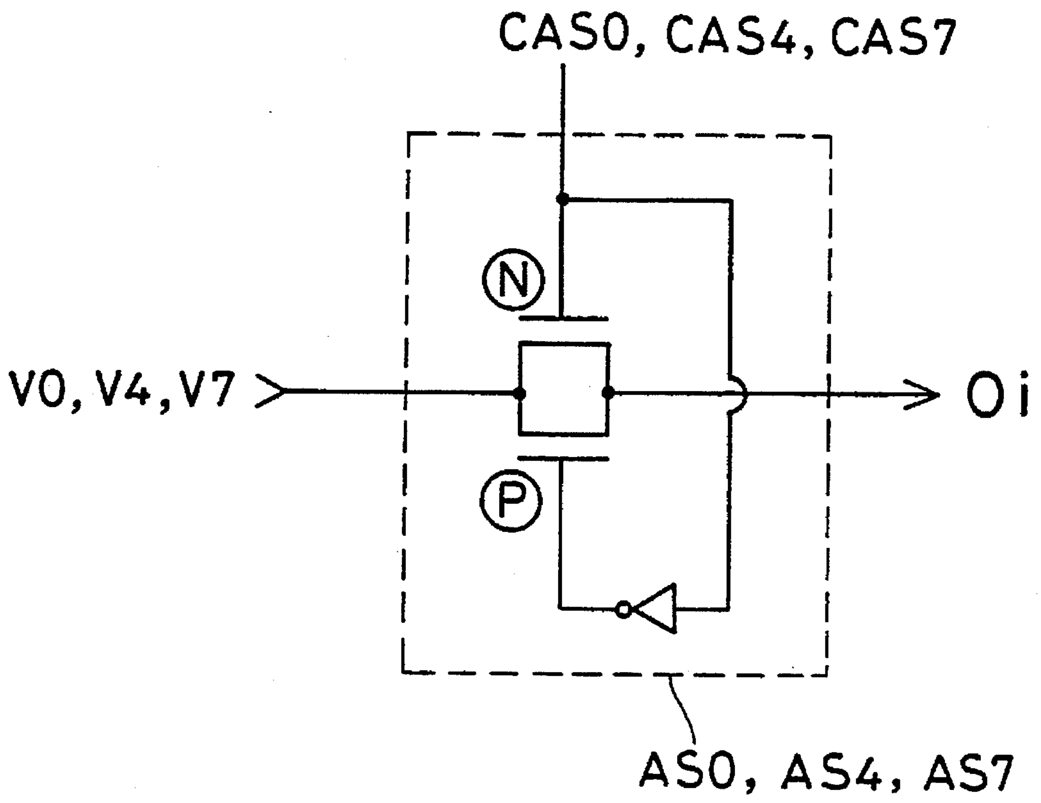
FIG. 5 PRIOR ART
FIG. 5 is a constitution drawing of an analogue switch.
Figure 6:
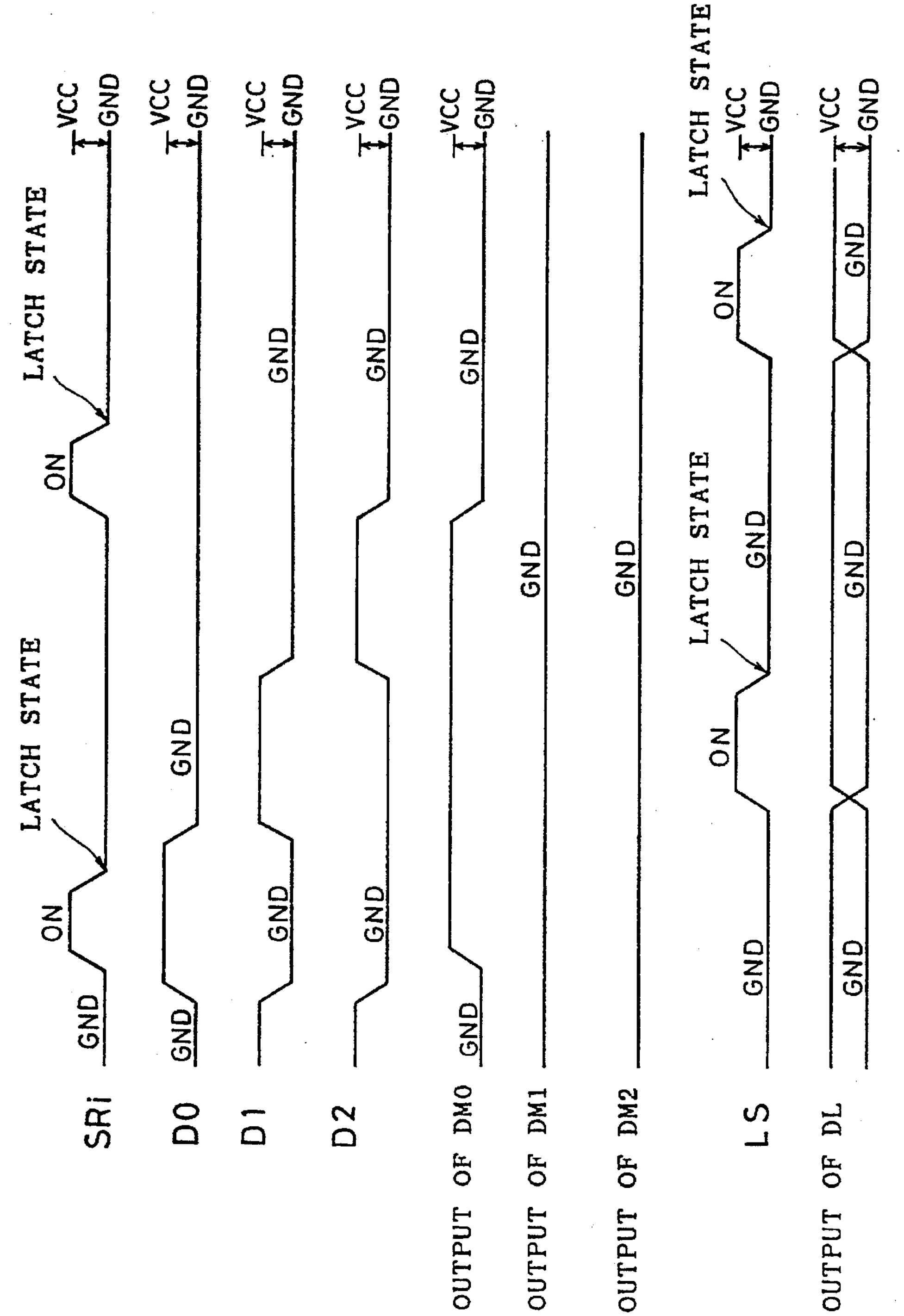
FIG. 6 PRIOR ART
FIG. 6 shows signal waveforms for explaining the operation of a source driver.
Figure 7:
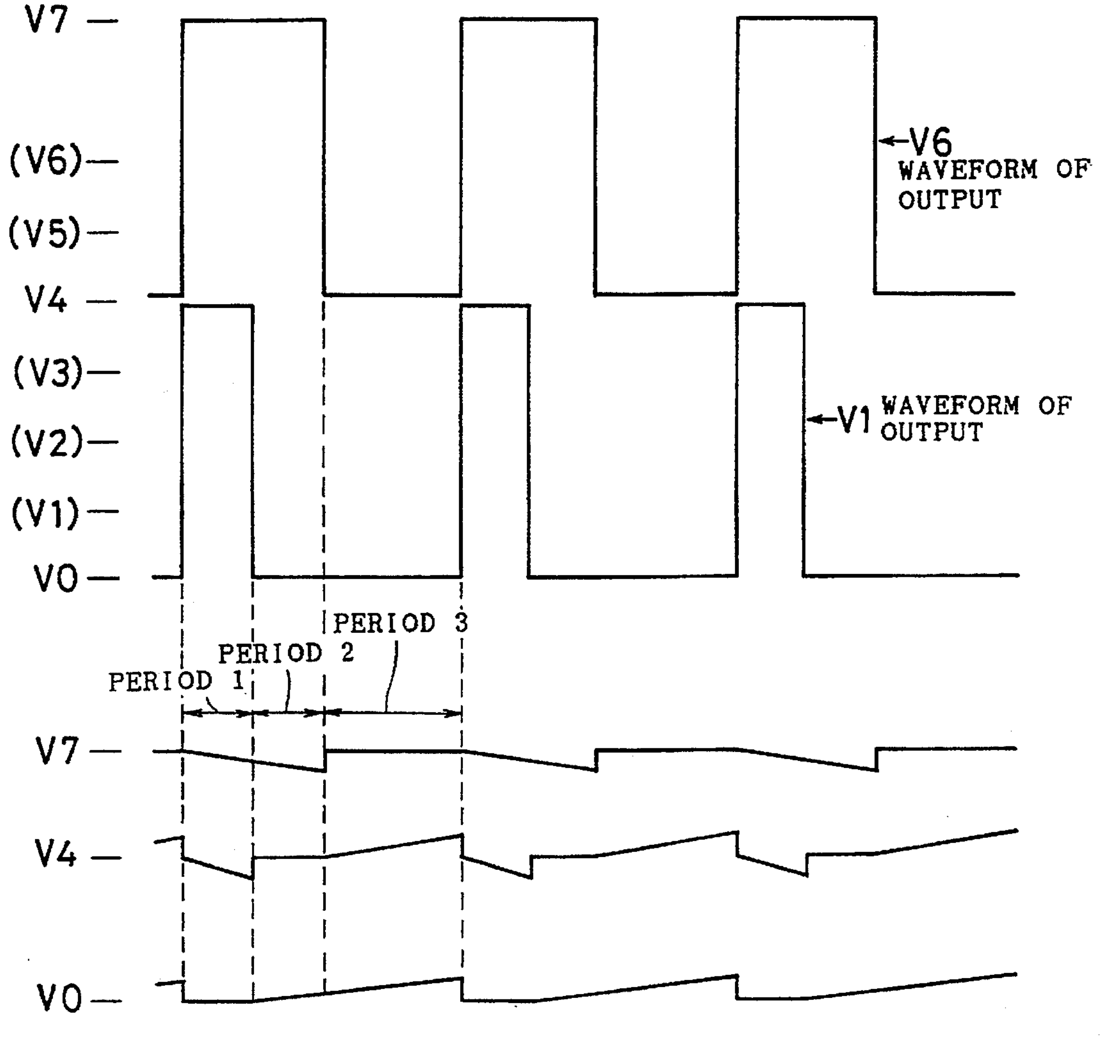
FIG. 7 PRIOR ART
FIG. 7 is a drawing showing voltage fluctuations of a reference power source in the conventional source driver of FIG. 2.
Figure 8:
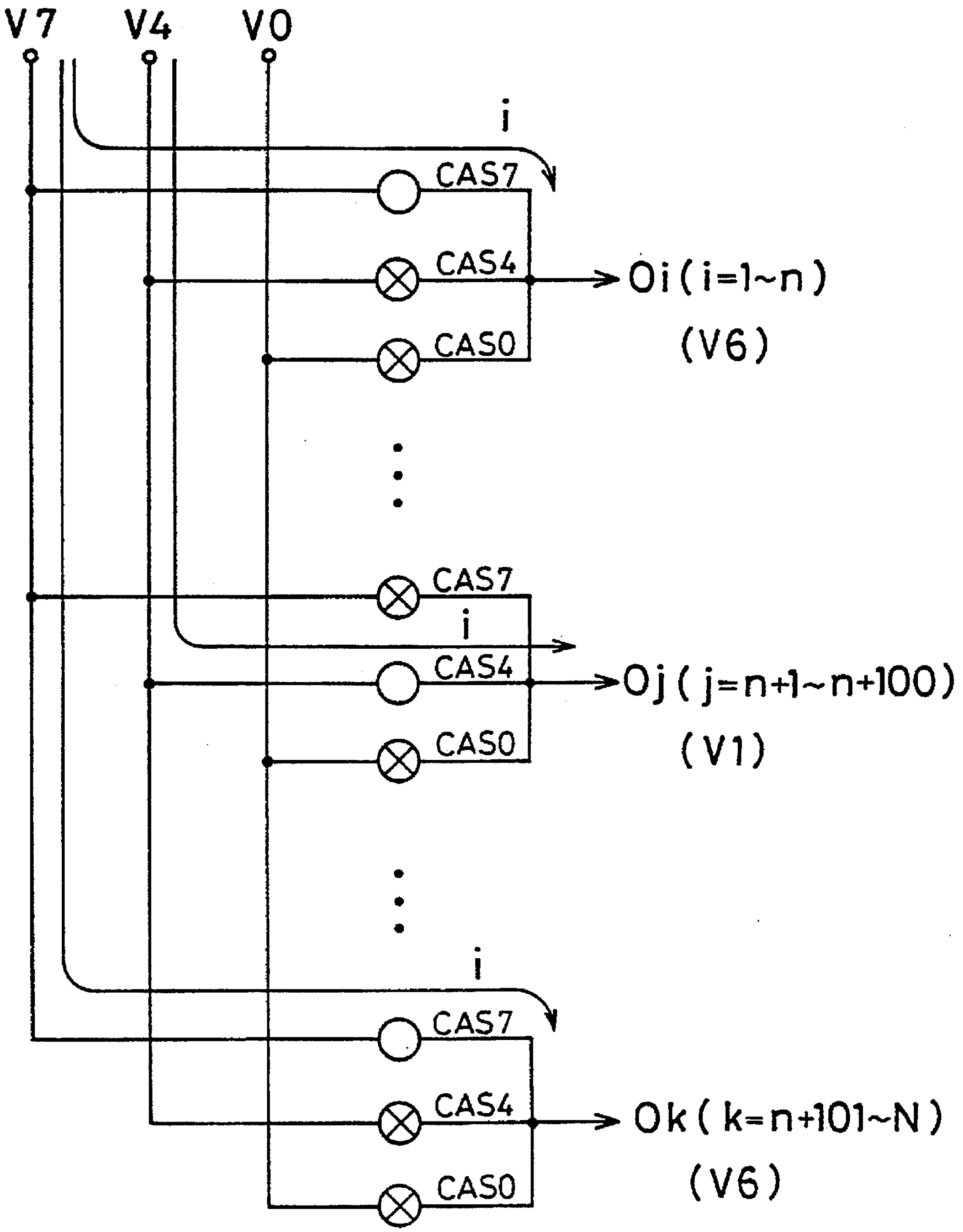
FIG. 8 PRIOR ART
FIG. 8 is a state drawing in a period 1 shown in FIG. 7.
Figure 9:
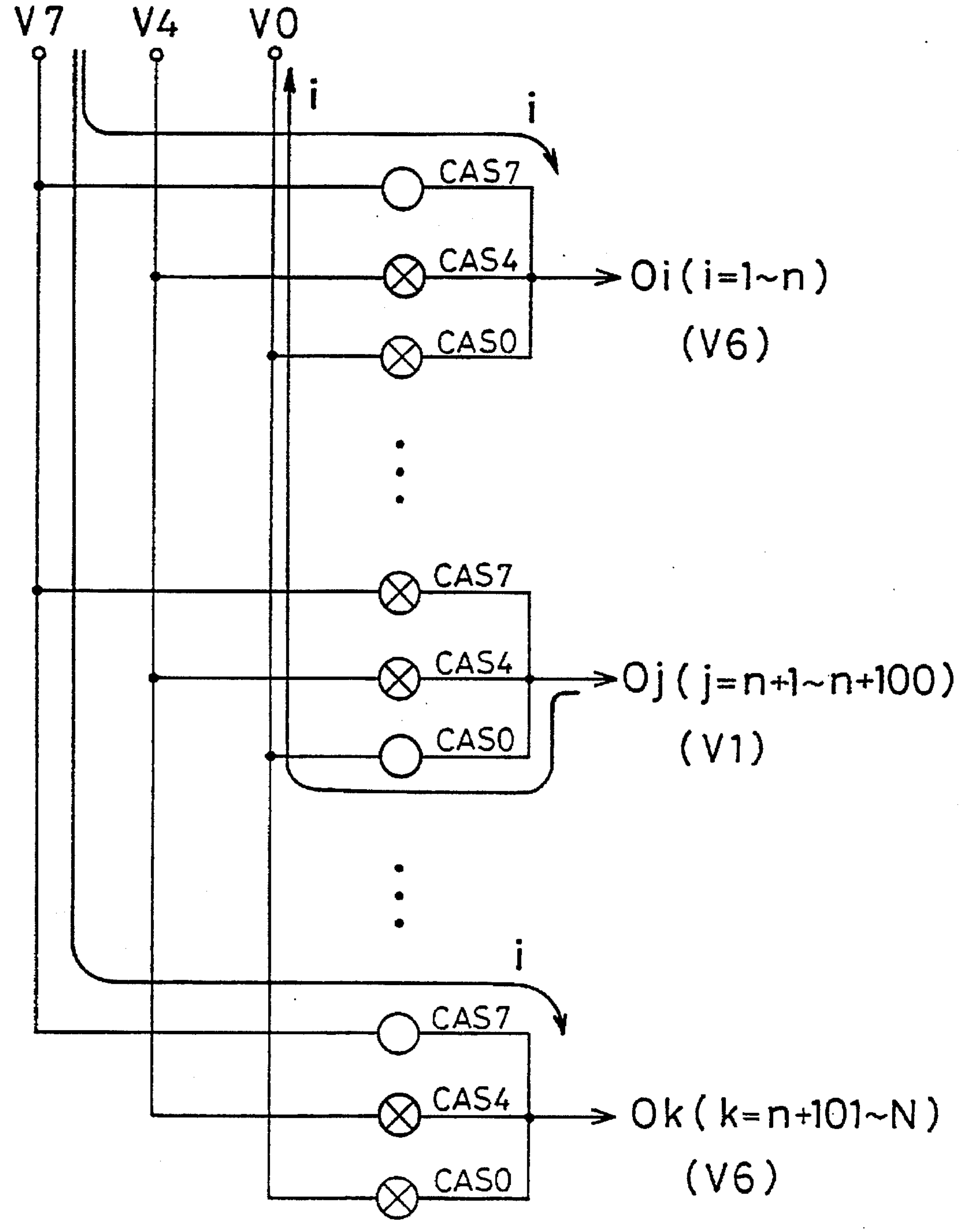
FIG. 9 PRIOR ART
FIG. 9 is a state drawing in a period 2 shown in FIG. 7.
Figure 10:
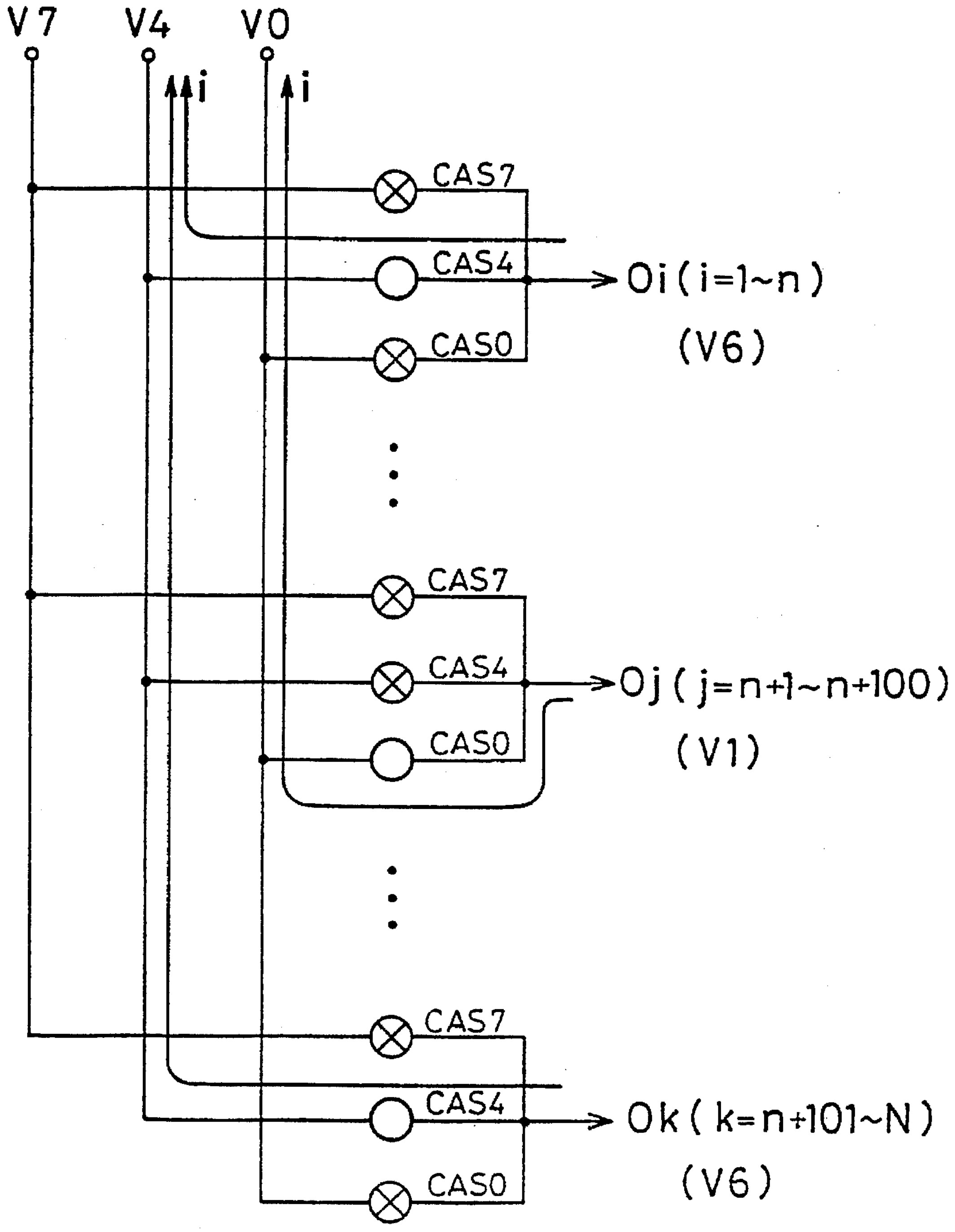
FIG. 10 PRIOR ART
FIG. 10 is a state drawing in a period 3 shown in FIG. 7.

Moreover, FIG. 5 shows an example of constitution of the analogue switches AS0, AS4A, AS7. Though in the example of FIG. 5, the switch includes a CMOS transfer gate, it may also include a transfer gate composed only of a MOS transistor of one channel which does not cause threshold voltage drop. For example, analogue switches AS0 and AS4B may be constituted with only a MOS transistor of N channel. Moreover, the analogue switches AS4A, AS7 may be constructed with a MOS transistor of P channel only by reversing the output of the decoder circuit.

As is apparent from FIG. 14 to FIG. 17 corresponding to FIG. 7 to FIG. 10 in the prior art, according to the embodiment of the invention, voltage fluctuations of the intermediate reference power sources V4A and V4B are caused only in the directions of decrease and increase, controlling the fluctuations of the intermediate reference power sources low and making it possible to improve the display definition.

Though, in the above embodiment, the digital drive source driver is constructed by providing independent pads and independent terminals in the respective intermediate reference power supply lines 4A, 4B, it may also be constructed in a way to have independent pads but with commonly shared terminals.

Additionally, another alternate constitution is also allowable in which only the intermediate reference power supply lines L4a, L4B are divided and a pad and a terminal are shared.

Figure 18A:
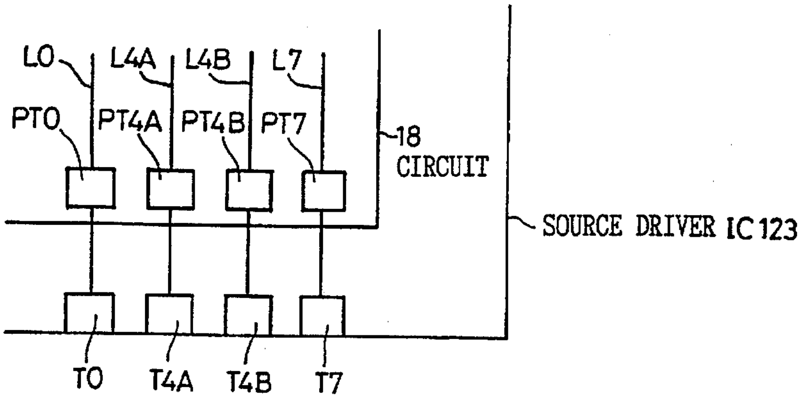
FIGS. 18A, 18B, 18C are drawings showing constitutions of reference power supply lines.

FIG. 18A is a drawing showing an embodiment in which the reference power supply lines LO, L4A, L4B, and L7 are provided with pads PTO, PT4A, PT4B and PT7 and terminals TO, T4A, T4b, and T7, respectively.

A circuit 18 shown in FIG. 18A is similar to that of FIG. 12. The pads PTO, PT4A, PT4B, and PT7 are connecting members which connect the circuit 18 and the source driver IC 123 including a top carrier package (hereinafter described as TCP), a mold package or the like. The reference power supply lines L0, L4A, L4B and L7 are lines for supplying the voltages from the intermediate reference power sources VO, V4A, V4B and V7, respectively.

The respective voltages from the intermediate reference power supply lines L4A, L4B are supplied via the pad PT4A and terminal T4A, and the pad PT4B and terminal T4B, respectively, from the external intermediate reference power sources V4A, VB of the source driver IC 123, respectively.

Figure 18B:
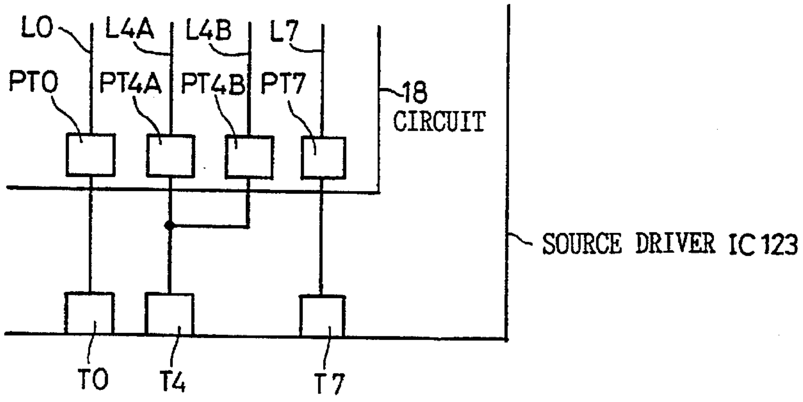

FIG. 18B is a drawing showing an embodiment in which the intermediate reference power supply lines L4A, L4B are individually provided with the pads PT4A, PT4B, respectively, and provided with a common terminal T4 to be shared.

Figure 18C:
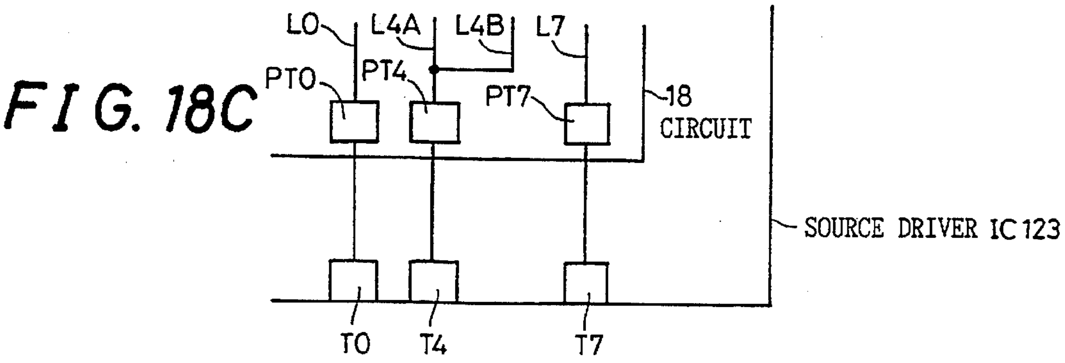

FIG. 18C is a drawing showing an embodiment in which the intermediate reference power supply lines LA and A4B are provided with a common pad PT4 and the common terminal T4 which are shared.

The numbers of pads and terminals are reduced in the embodiments shown in FIGS. 18B and 18C, resulting in simplification of the constitution.

FIGS. 18B, 18C are similar to FIG. 18A, and the parts in FIGS. 18B, 18C corresponding to those in FIG. 18A are represented by the same reference numerals.

Figure 19:
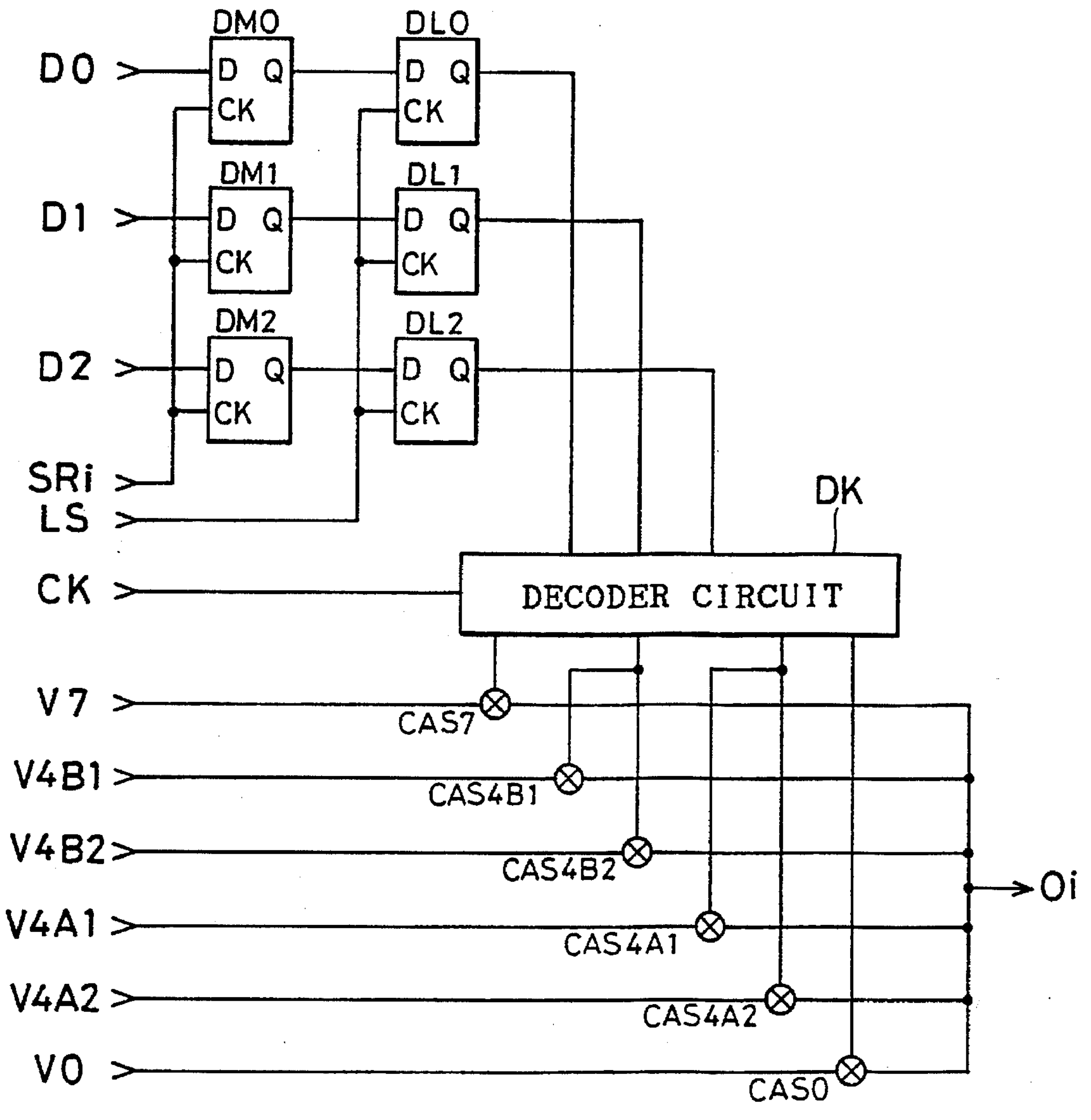
FIG. 19 is an internal constitution drawing of a source driver of another embodiment of the invention.

FIG. 19 shows an embodiment in which the lines of the respective intermediate reference power sources V4A, V4B are further divided into two parts. The relations V4A1=V4A2=V4, V4B1=V4B2=V4 are established. The construction of the decoder circuit DK is the same as that in FIG. 12. According to the embodiment, the resistance of the supply line can be reduced. The decoder circuit DK supplies the same control signal as that supplied to the analogue switch CAS4A in FIG. 12 to the analogue switches CAS4A1, CAS4A2.

The decoder circuit DK also supplies to the analogue switches CAS4B1, CAS4B2 the same control signal as that supplied to the analogue switch CAS4B in FIG. 12.

As seen from the above, the analogue switches CAS4A1, CAS4A2 make one and the same opening/closing operation. The same is true also with the analogue switches CAS4B1, CAS4B2.

Next, an embodiment in which AC drive is also taken into consideration will be described.

Figure 20:
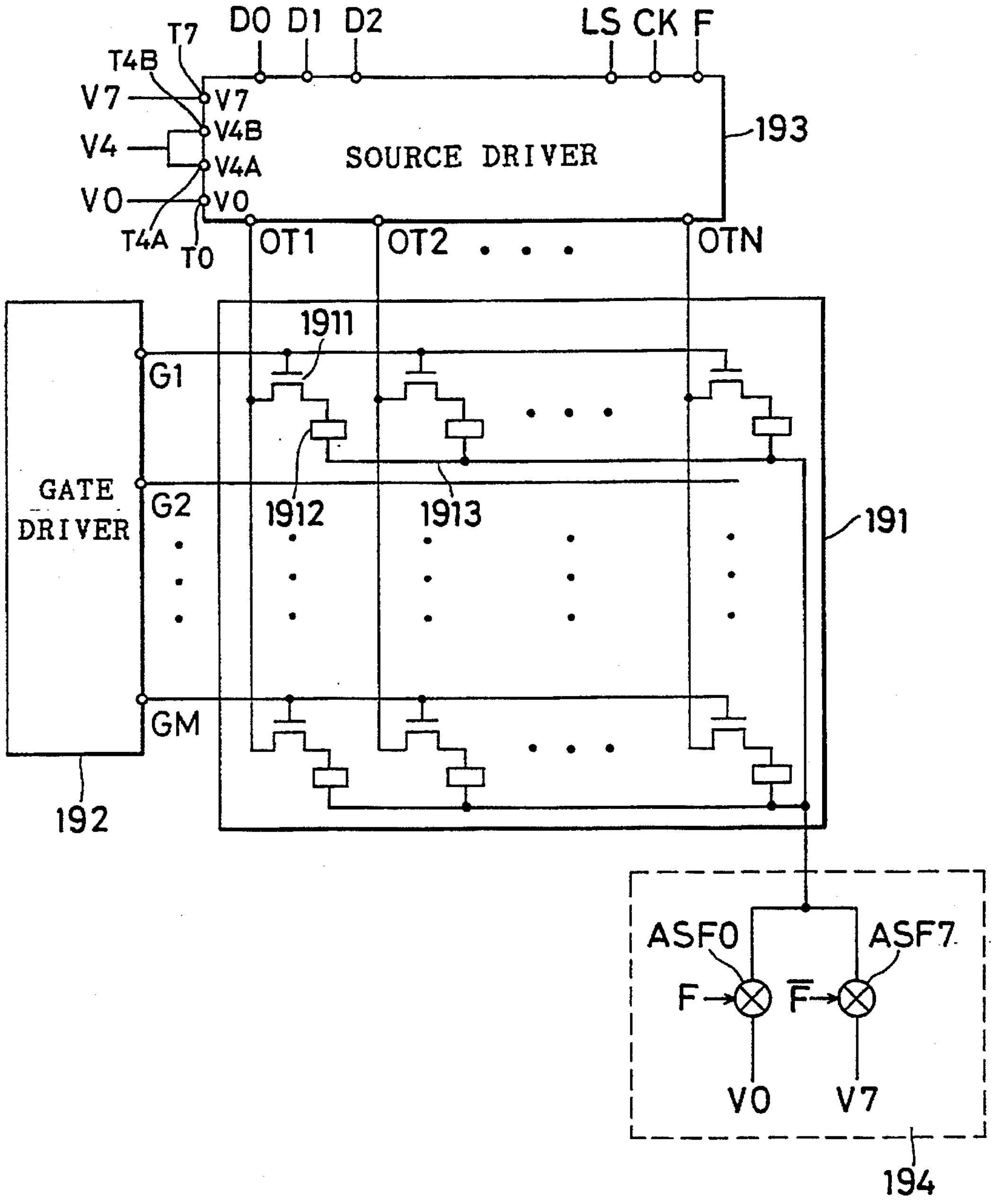
FIG. 20 is a constitution drawing of a TFT liquid crystal display according to the invention.
Figure 21:
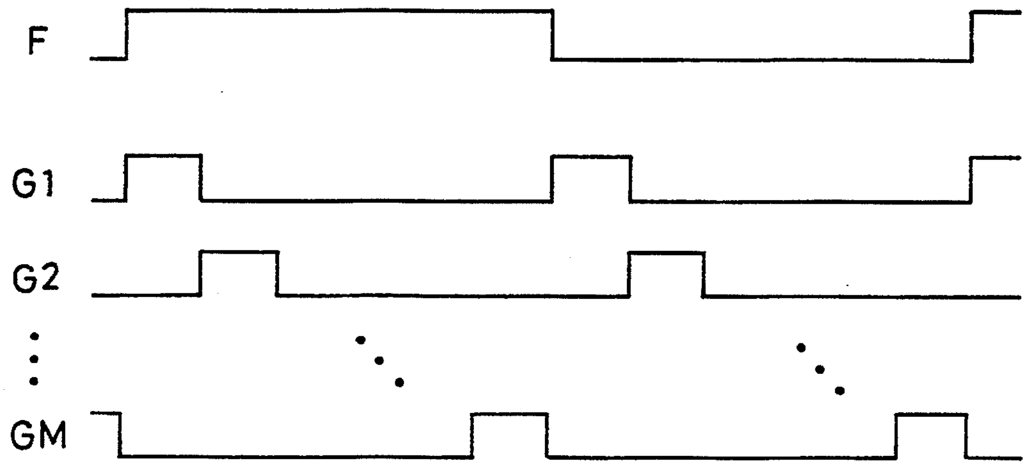
FIG. 21 shows waveforms of a frame signal F and gate drive pulses G1, . . . GM shown in FIG. 20.

FIG. 20 is a drawing showing a TFT liquid crystal display apparatus 191, a gate driver IC 192 which is the driver thereof, a source driver IC 193 which is an embodiment of the present invention, and a common electrode drive circuit 194 which generates frame signals F, $\overline{F}$. Each picture element of the TFT liquid crystal display apparatus 191 consists of a TFT (MOSFET) 1911 and a liquid crystal element 1912. To a common electrode 1913 of the liquid crystal element 1912, a potential V0 (at F=1) or V7 (frame of F=0) is supplied alternately by frame by means of the analogue switches ASF0, ASF7 which are controlled for opening/closing by frame signals F, $\overline{F}$. The gate driver IC 192 outputs gate drive pulses G1, . . . , GM with phases shifted one after another. FIG. 21 shows the waveforms of the frame signal F and gate drive pulses G1, . . . , GM.

On the other hand, the source driver IC 193 (8-gradation display) outputs one selected potential or two selected potentials by time sharing (alternately) from among the reference power sources V0, V4A (=V4), V4B (=V4A=V4) and V7 (supplied from outside through terminals T0, T4A, T4B, and T7 respectively) according to the display data D0, D1 and D2 input from a display controller (not shown) at the output terminals OT1, . . . , OTN.

The system may also be constructed in a way to provide the common electrode drive circuit 194 in the source driver IC 193.

Figure 22:
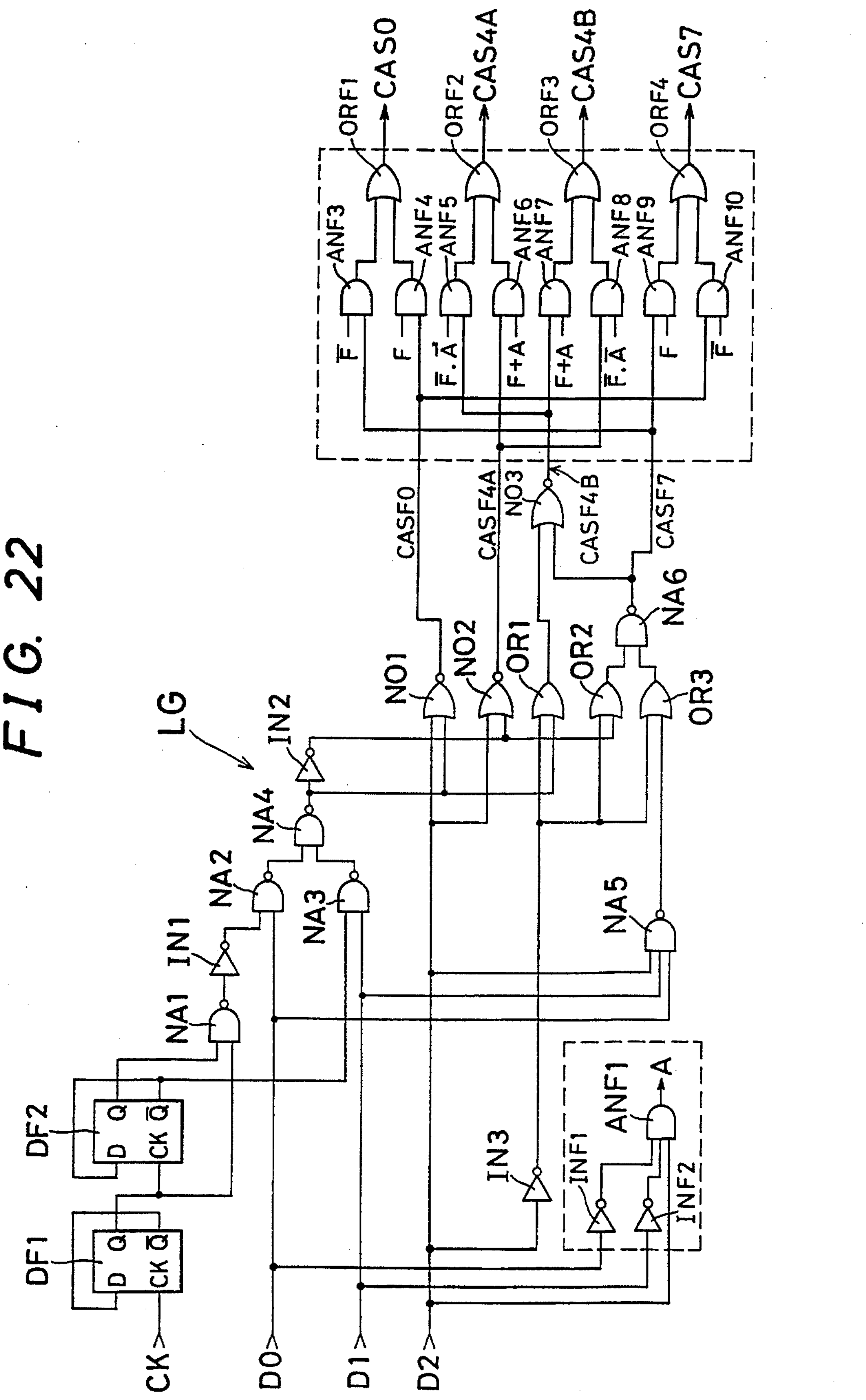
FIG. 22 is an internal constitution drawing of a decoder circuit in a source driver shown in FIG. 20.

The internal construction of the source driver IC 193 is the same as the one in FIG. 12 as an block, but different in decoder circuit construction. FIG. 22 is an internal constitution drawing of the decoder circuit DK in the embodiment. The portions surrounded by broken lines are added to the embodiment shown in FIG. 13, making it possible to output, at the output Oi, the prescribed drive voltage, which is variable with each frame according to the change of potentials (V0→V7→Vo→ . . . ) of the common electrode in the liquid crystal element.

The portion surrounded by broken lines at the bottom left in FIG. 22 is constructed with inverter circuits INF1, INF2 and an AND circuit ANF1.

The inverter circuit INF1 inputs the display data DO and outputs to the AND circuit ANF1. The inverter circuit INF2 inputs the display data D1 and outputs to the AND circuit ANF1. The AND circuit ANF1 inputs the output of the inverter circuits IN1, INF2 and the display data D2 and outputs the signal A. Reference numerals CASF0, CASF4A, CASF4B, CASF7 designate output signals of the logical gate LG.

The portion surrounded by broken lines at the bottom right in FIG. 22 is constructed with the AND circuits ANF3, ANF4, ANFS, ANF6, ANF7, ANF8, ANF9, ANF10 and OR circuits ORF1, ORF2, ORF3, ORF4.

The AND circuit ANF3 inputs the frame signal $\overline{F}$ and the output signal CASF7 of the logical gate LG and outputs to the OR circuit ORF1. The AND circuit ANF4 inputs the frame signal F and the output signal CASF0 of the logical gate LG, and outputs to the OR circuit ORF1. The OR circuit ORF1 inputs the outputs of the respective AND circuits ANF3, ANF4 and outputs the analogue switch control signal CAS0.

The AND circuit ANF5 inputs the signal of conjunction of the frame signal $\overline{F}$ and the output signal $\overline{A}$ of the AND circuit ANF1, and the output signal CASF4B of the logical gate LG, and outputs to the OR circuit ORF2. The AND circuit ANF6 inputs the output signal CASF4A of the logical gate LG, and the signal of disjunction of the frame signal F and the output signal A of the AND circuit ANF1, and outputs to the OR circuit ORF2. The OR circuit ORF2 inputs the outputs of the respective AND circuits ANF5, ANF6 and outputs the analogue switch control signal CAS4A.

The AND circuit ANF7 inputs the output signal CASF4B of the logical gate LG, the signal of the disjunction of the frame signal F and the output signal A of the AND circuit ANF1, and outputs to the OR circuit ORF3. The AND circuit ANF8 inputs the output signal CASF4A of the logical gate LG, and the signal of the conjunction of the frame signal $\overline{F}$ and the output signal $\overline{A}$ of the AND circuit ANF1, and outputs to the OR circuit ORF3. The OR circuit ORF3 inputs the outputs of the respective AND circuits ANF7, ANF8 and outputs the analogue switch control signal CAS4B.

The AND circuit ANF9 inputs the output signal CASF7 of the logical LG and the frame signal $\overline{F}$, and outputs to the OR circuit ORF4. The AND circuit ANF10 inputs the output signal CASFO of the logical gate LG and the frame signal F, and outputs to the OR circuit ORF4. The OR circuit ORF4 inputs the outputs of the respective AND circuits ANF9, ANF10 and outputs the analogue switch control signal CAS7.

Table 3 indicates the correspondence between the input display data D2, D1, D0 and the output signals CAS0, CAS4A, CAS4B, CAS7 of the decoder circuit DK.

Figure 23:
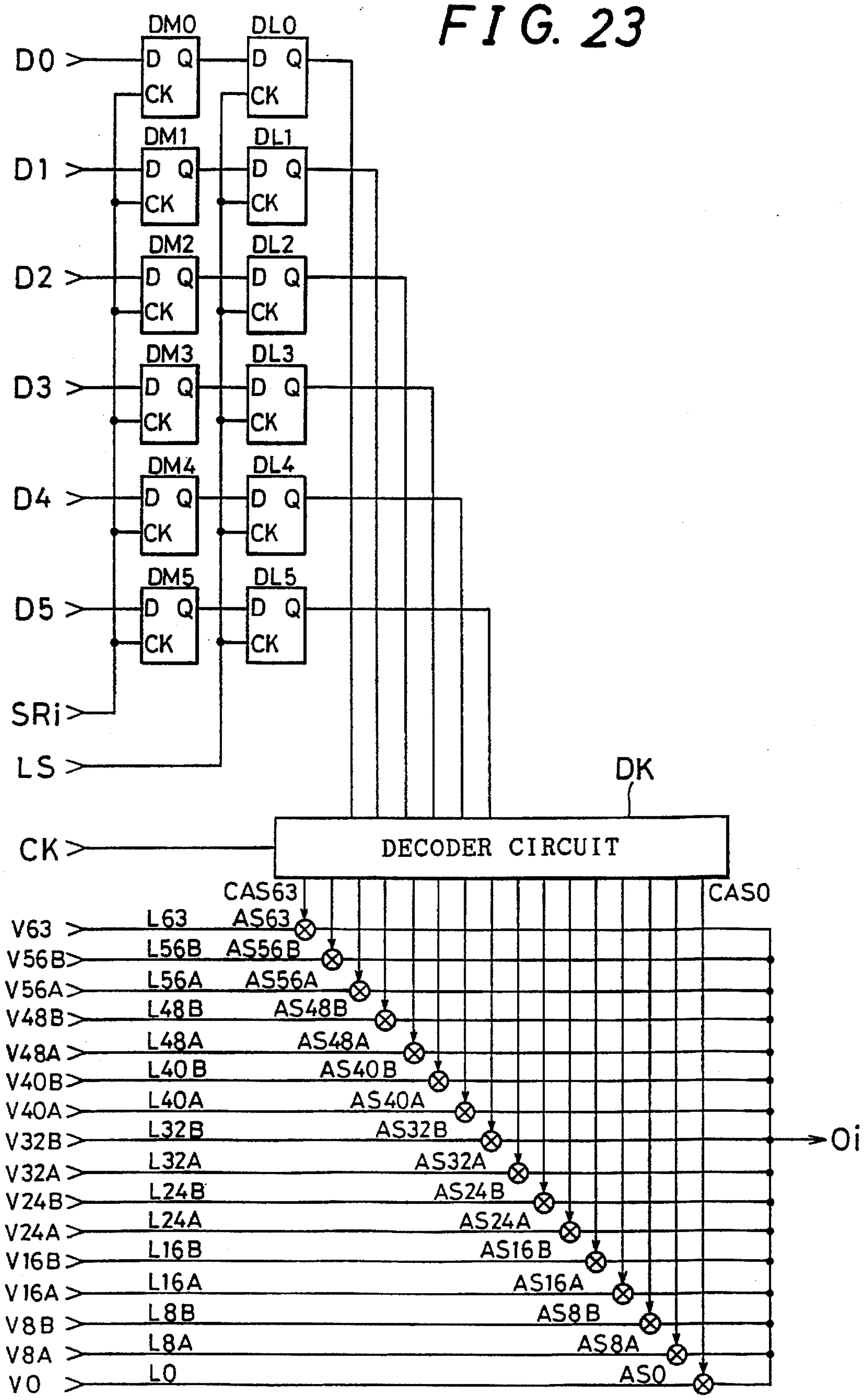
FIG. 23 is an internal constitution drawing of a source drive of still another embodiment of the invention.

FIG. 23 is an internal constitution drawing of the embodiment of 64-gradation display. In the same way as in FIG. 12, this drawing indicates only the portion corresponding to one output terminal. In the case of the 64-gradation display, there are 7 intermediate reference power sources V8, V16, V24, V40, V48, V56 and the lines of the 7 reference power sources are divided into 2 parts, respectively.

Reference numerals D0–D5 designate display data (6-bits), reference numerals DM0–DM5 designate data memory circuits which fetch and store the display data DO–D5 at the timing of the clock signal SRi (i=1, . . . , N), reference numerals DL0–DL5 designate display latch circuits which latch the outputs of the data memory circuits at the timing of the clock signal LS, reference numerals V0, V8A, V8B, . . . , V56A, V56B, and V63 designate reference power sources, reference numerals L0, L8A, L8B . . . L56A, L56B and L63 designate supply lines of the respective reference power sources V0, V8A, V8B . . . , V56A, VS6B and V63, reference numerals AS0, AS8A, AS8B, . . . , AS56A, AS56B and AS63 designate analogue switches installed on the respective power supply lines, a reference numeral DK designates a decoder circuit which outputs CASO, CAS8A, CAS8B, . . . , CAS56A, CAS56B and CAS63 controlling opening/closing of the analogue switches ASO, AS8A, AS8B . . . , AS56A, AS56B based on the outputs of the display latch circuits DL0–DL5 and a clock signal CK, and a reference numeral Oi designates an output to the display apparatus.

Table 4 indicates the correspondence between the input display data DS–D0 and the output signals CAS0, CAS8A, CAS8, . . . , CAS56A, CAS56B and CAS64 of the decoder circuit DK.

TABLE 3

| INPUTTED DISPLAY DATA | | | F = 1 | | | | F = 1 | | | |
|---|---|---|---|---|---|---|---|---|---|---|
| D2 | D1 | D0 | CAS0 | CAS4A | CAS4B | CAS7 | CAS0 | CAS4A | CAS4B | CAS7 |
| 0 | 0 | 0 | 1 | | | | | | | 1 |
| 0 | 0 | 1 | 3t | $\overline{3t}$ | | | | | $\overline{3t}$ | 3t |
| 0 | 1 | 0 | 2t | $\overline{2t}$ | | | | | $\overline{2t}$ | 2t |
| 0 | 1 | 1 | 1t | $\overline{1t}$ | | | | | $\overline{1t}$ | 1t |
| 1 | 0 | 0 | | 1 | | | | | 1 | |
| 1 | 0 | 1 | | | 3t | $\overline{3t}$ | $\overline{3t}$ | 3t | | |
| 1 | 1 | 0 | | | 2t | $\overline{2t}$ | $\overline{2t}$ | 2t | | |
| 1 | 1 | 1 | | | | 1 | 1 | | | |

The blank parts are all "0".

Figure 4:
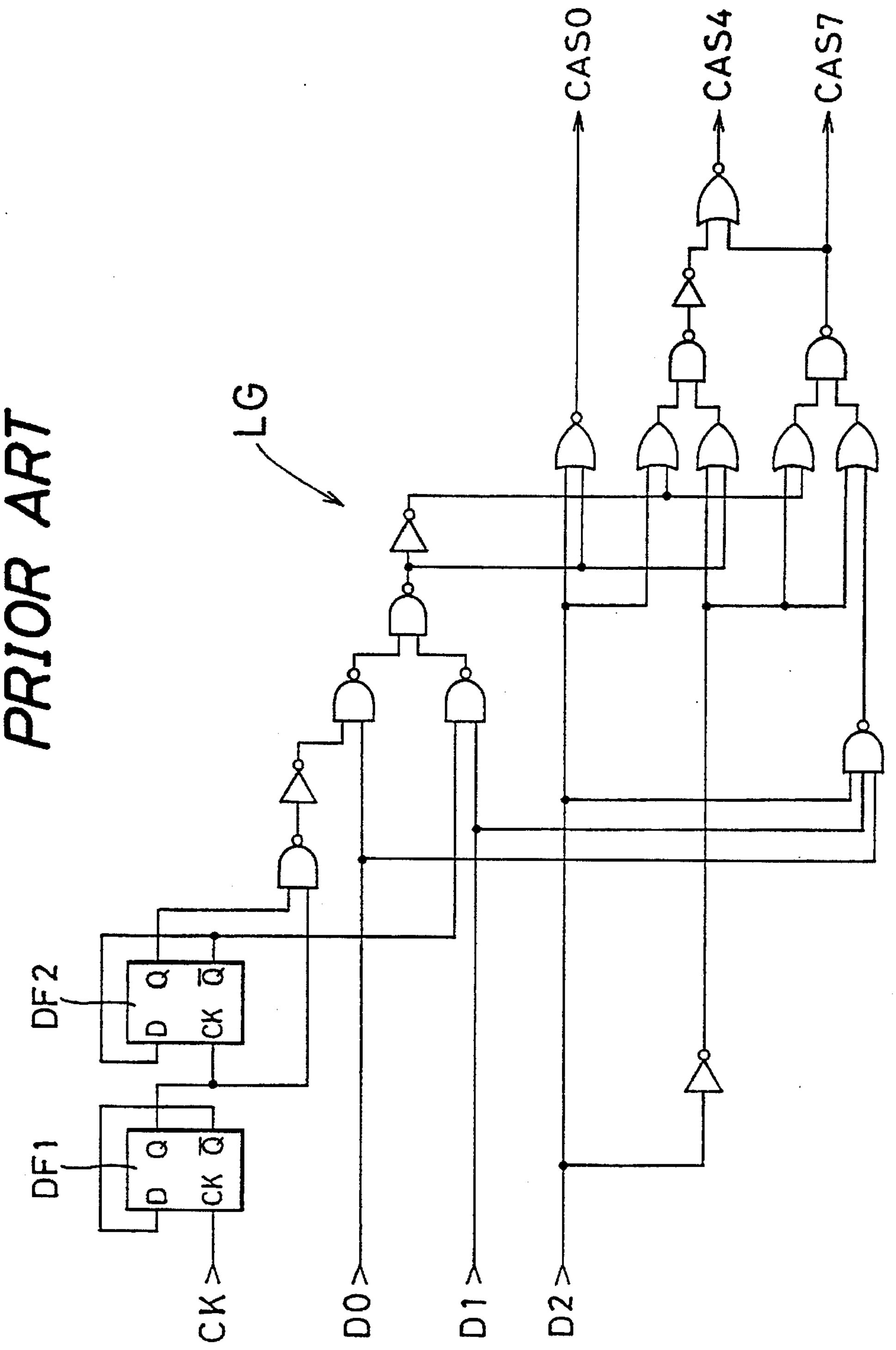
FIG. 4 PRIOR ART
FIG. 4 is an internal constitution drawing of the decoder circuit of FIG. 2.

The waveforms of the respective signals 1t, 2t, 3t, 1 of the decoder circuit outputs are the same as in FIG. 4.

TABLE 4

| D5 | D4 | D3 | D2 | D1 | D0 | CAS0 | CAS8A | CAS8B | CAS16A | CAS16B | CAS24A | CAS24B | CAS32A | CAS32B | CAS40A | CAS40B | CAS48A | CAS48B | CAS56A | CAS56B | CAS63 |
|---|---|---|---|---|---|---|---|---|---|---|---|---|---|---|---|---|---|---|---|---|---|
| 0 | 0 | 0 | 0 | 0 | 0 | 1 | | | | | | | | | | | | | | | |
| 0 | 0 | 0 | 0 | 0 | 1 | 7t | $\overline{7t}$ | | | | | | | | | | | | | | |
| 0 | 0 | 0 | 0 | 1 | 0 | 6t | $\overline{6t}$ | | | | | | | | | | | | | | |
| 0 | 0 | 0 | 0 | 1 | 1 | 5t | $\overline{5t}$ | | | | | | | | | | | | | | |
| 0 | 0 | 0 | 1 | 0 | 0 | 4t | $\overline{4t}$ | | | | | | | | | | | | | | |
| 0 | 0 | 0 | 1 | 0 | 1 | 3t | $\overline{3t}$ | | | | | | | | | | | | | | |
| 0 | 0 | 0 | 1 | 1 | 0 | 2t | $\overline{2t}$ | | | | | | | | | | | | | | |
| 0 | 0 | 0 | 1 | 1 | 1 | 1t | $\overline{1t}$ | | | | | | | | | | | | | | |
| 0 | 0 | 1 | 0 | 0 | 0 | | 1 | | | | | | | | | | | | | | |
| 0 | 0 | 1 | 0 | 0 | 1 | | | 7t | $\overline{7t}$ | | | | | | | | | | | | |
| 0 | 0 | 1 | 0 | 1 | 0 | | | 6t | $\overline{6t}$ | | | | | | | | | | | | |
| . | . | . | . | . | . | | | . | . | | | | | | | | | | | | |
| . | . | . | . | . | . | | | . | . | | | | | | | | | | | | |
| . | . | . | . | . | . | | | . | . | . | . | . | . | . | . | | | | | | |
| . | . | . | . | . | . | | | | | | | | | | | . | . | . | . | | |
| . | . | . | . | . | . | | | | | | | | | | | | | . | . | | |
| 1 | 1 | 0 | 1 | 1 | 0 | | | | | | | | | | | | | 2t | $\overline{2t}$ | | |
| 1 | 1 | 0 | 1 | 1 | 1 | | | | | | | | | | | | | 1t | $\overline{1t}$ | | |
| 1 | 1 | 1 | 0 | 0 | 0 | | | | | | | | | | | | | | 1 | | |
| 1 | 1 | 1 | 0 | 0 | 1 | | | | | | | | | | | | | | | 7t | $\overline{7t}$ |
| 1 | 1 | 1 | 0 | 1 | 0 | | | | | | | | | | | | | | | 6t | $\overline{6t}$ |
| 1 | 1 | 1 | 0 | 1 | 1 | | | | | | | | | | | | | | | 5t | $\overline{5t}$ |
| 1 | 1 | 1 | 1 | 0 | 0 | | | | | | | | | | | | | | | 4t | $\overline{4t}$ |
| 1 | 1 | 1 | 1 | 0 | 1 | | | | | | | | | | | | | | | 3t | $\overline{3t}$ |
| 1 | 1 | 1 | 1 | 1 | 0 | | | | | | | | | | | | | | | 2t | $\overline{2t}$ |
| 1 | 1 | 1 | 1 | 1 | 1 | | | | | | | | | | | | | | | | 1 |

The blank parts are all "0".

Figure 24:
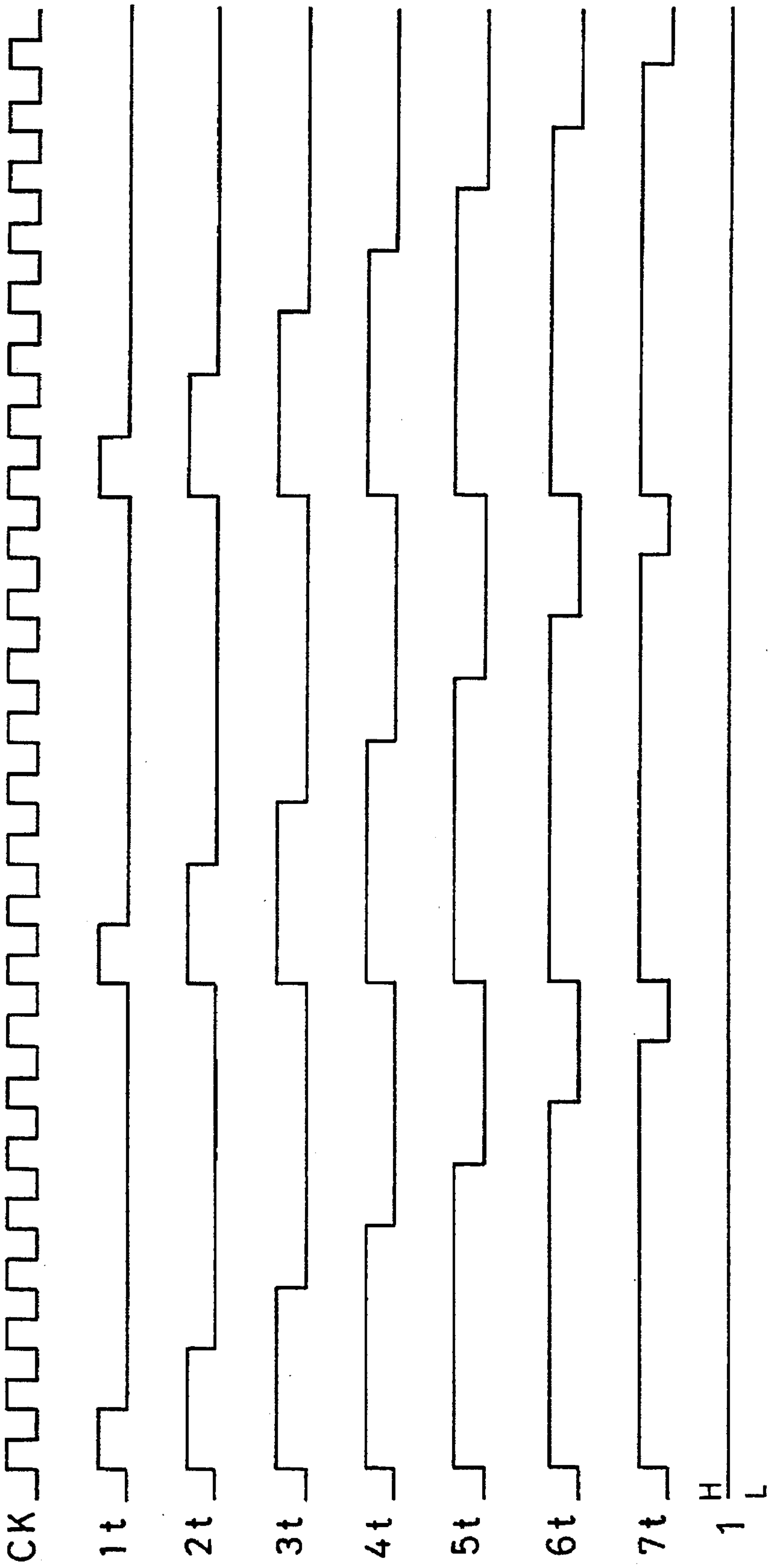
FIG. 24 shows signal waveforms for explaining a decoder circuit shown in FIG. 23.

Moreover, FIG. 24 shows the waveforms of the decoder circuit output signals 1t–t, 1 given in FIG. 4.

Figure 25:
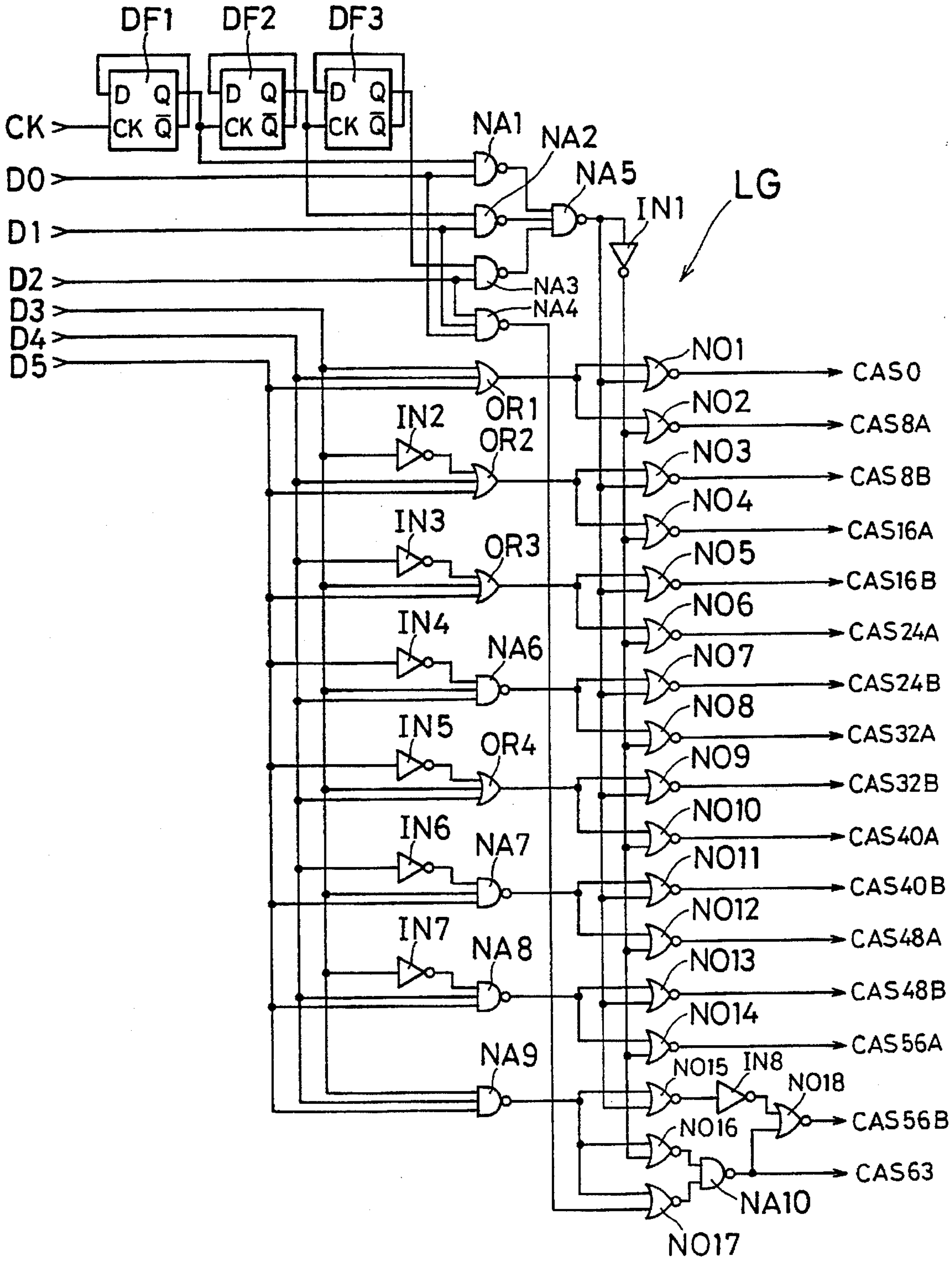
FIG. 25 is an internal constitution drawing of the decoder circuit shown in FIG. 23.

FIG. 25 indicates another embodiment of the decoder circuit DK. This circuit is composed of 3-step D type flip-flops DF1, DF2, DF3 constituting the dividing circuit of the clock signal CK and a logical gate LG which generates and outputs analogue switch control signals CAS0, CAS8A, CAS8B, . . . , CAS56A, CAS56B, and CA863 given in Table 4 based on the outputs of the flip-flops and the display data DO–D5. The logic gate LG is composed of the NAND circuits NA1–NAIO, inverter circuits IN1–IN8, OR circuits OR1–OR4 and NOR circuits NO1–NO18.

The NAND circuit NA1 inputs the output Q of the flip-flop DF1 and the display data DO and outputs to the NAND circuit NA5. The NAND circuit NA2 inputs the output Q of the flip-flop DF2 and the display data D1 and outputs to the NAND circuit NAS. The NAND circuit NA3 inputs the output Q of the flip-flop DF3 and the display data D2 and outputs the NAND circuit NA5. The NAND circuit NA5 inputs the output Q of the NAND circuits NA1, NA2, NA3 and outputs via the inverter circuit IN1 to the even numbered circuit of the NOR circuits NO1–NO16 but directly to the odd numbered circuits.

The NAND circuit NA4 inputs the display data D0, D1, D2 and outputs to the NOR circuit NO17. The OR circuit OR1 inputs the display data D0, D1, D2 and outputs to the NOR circuit NO1, NO2.

The OR circuit OR2 inputs the display data D3 via the inverter circuit IN2 and also inputs display data D4, D5 on the other hand, and outputs to the NOR circuits NO3, NO4. The OR circuit OR3 inputs the display data D4 via the inverter circuit IN3 and also inputs display data D3, D5 on the other hand, and outputs to the NOR circuits NO5, NO6.

The NAND circuit NA6 inputs the display data D5 via the inverter circuit IN4 and also inputs the display data D3, D4 on the other hand, and outputs to the NOR circuits NO7, NO8.

The OR circuit OR4 inputs the display data D5 via the inverter circuit IN5 and also inputs display data D3, D4 on the other hand, outputs to the NOR circuits NO9, NO10. The NAND circuit NA7 inputs the display data D4 via the inverter circuit IN6 and also inputs the display data D3, D5 on the other hand, and outputs to the NOR circuits NO11, NO12. The NAND circuit NA8 inputs the display data D3 via the inverter circuit IN7 and also inputs the display data D4, D5 on the other hand, and outputs to the NOR circuits NO13, NO14.

The NAND circuit NA9 inputs the display data D3, D4, D5 and outputs to the NOR circuits NO15, NO16, NO17.

The NOR circuits NO1, NO3, NO5, NO9 input the outputs of the OR circuits OR1, OR2, OR3, OR4, respectively, as well as the output of the NAND circuit NA5 and generate the analogue switch control signals CAS0, CAS8B, CAS16B, CAS32B. The NOR circuits NO2, NO4, NO6, NO10 input the outputs of the OR circuits OR1, OR2, OR3, OR4, respectively, as well as the output of the inverter circuit IN1 and generate the analogue switch control signals CAS8A, CAS16A, CAS24A, CAS32A.

The NOR circuits NO7, NO11, NO13 input the outputs of the NAND circuits NA6, NA7, NA8, respectively, as well as the output of the NAND circuit NA5, and generate the analogue switch control signals CAS24B, CAS40B, CAS48B. The NOR circuits NO8, NO10, NO12 input the outputs of the NAND circuits NA6, NA7, NA8, respectively, as well as the output of the inverter circuit IN1 and generate the analogue switch control signals CAS32A, CAS48A, CAS56A.

The NOR circuit NO15 inputs the outputs of the NAND circuits NA5, NA9 and outputs to the NOR circuits NA18 via the inverter circuit IN8. The NOR circuit NO16 inputs the outputs of the NAND circuit NA9 and the inverter circuit IN1, and outputs to the NAND circuit NA10. The NOR circuit NO17 inputs the outputs of the NAND circuits NA4, NA9 and outputs to the NAND circuit NA10.

The NAND circuit NA10 inputs the outputs of the NOR circuits NO16, NO17, generates the analogue switch control signal CAS63 and outputs to the NOR circuit NO18. The NOR circuit NO18 inputs the outputs of the inverter circuit IN8 and the NAND circuit NA10, and generates the analogue switch CAS56B.

Moreover, FIG. 5 shows a constitution example of all the analogue switches shown in FIG. 23. Though, in the example of FIG. 5, each switch is constituted with a CMOS transfer gate, it may also be constituted with a transfer gate composed only of a MOS transistor of one channel which dose not cause any threshold voltage drop. The respective analogue switches AS8B, AS16B, AS24B, AS32B, AS40B, AS48B, AS56B may be constructed, for example, with only a MOS transistor of N channel. Moreover, the respective analogue switches AS8A, AS16A, AS24A, AS32A, AS40A, AS48A, AS56A, AS63 may be constructed only with a MOS transistor of P channel by reversing the output of the decoder circuit.

The above described embodiments so far are all those that represent the implementation of the invention in the digital drive source driver of a TFT liquid crystal display apparatus. However, the invention is effectively embodied also with drivers of other liquid crystal display apparatuses and with drivers of other display apparatuses so far as they are of a constitution in which the potential of two reference power sources selected from among a plurality of reference power sources is fed by time sharing to the display apparatus based on displayed data, and can improve the display definition by suppressing the voltage fluctuations of the reference power sources low.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A display driver comprising:

means for supplying potentials of two reference power sources selected from among a plurality of reference power sources on the basis of displayed data to a display apparatus by time sharing; and a supply line for an intermediate value reference power source among the plurality of reference power sources being divided into two supply lines including a first supply line along which only voltages equal to or greater than an intermediate voltage from said intermediate value reference power source are supplied, and a second supply line along which only voltages equal to or less than said intermediate voltage from said intermediate value reference power source are supplied.

2. The display device of claim 1, further comprising:

a first power supply terminal connecting said first supply line to the intermediate value reference power source; and a second power supply terminal connecting said second supply line to the intermediate value reference power source.

3. The display device of claim 1, wherein said two supply lines have a common terminal connecting them to the intermediate value reference power source.

4. The display device of claim 3, wherein said two supply lines sharing said common terminal have a common pad.

5. The display device of claim 1, wherein said supply line is split into more than two supply lines.

6. A method of supplying a stable voltage to a display apparatus comprising the steps of:

supplying a plurality of reference voltages to a display driver for the display apparatus; and supplying an intermediate value reference voltage using two supply lines, including supplying only voltages equal to or greater than an intermediate voltage from said intermediate value reference power source along a first supply line of said two supply lines, and supplying only voltages equal to or less than said intermediate voltage from said intermediate value reference power source along a second supply line of said two supply lines.

7. The method of claim 6, further comprising:

connecting said first supply line to the intermediate value reference power source via a first power supply terminal; and connecting said second supply line to the intermediate value reference power source via a second power supply terminal.

8. The method of claim 6, further comprising connecting said first supply line and said second supply line to the intermediate value reference power source via a common terminal.

9. The method of claim 8, further comprising providing said two supply lines sharing said common terminal with a common pad.

10. The method of claim 6, wherein said supplying of the intermediate value reference voltage is along more than two supply line.

11. The display device of claim 1, wherein said intermediate value reference source includes a plurality of intermediate value reference power sources, each having a respective said first supply line and a respective said second supply line.

12. The display device of claim 1, wherein said means for supplying potentials includes a plurality of switches, each switch being located in a respective supply line for each of said plurality of reference power sources, including each of said first supply line and said second supply line, said display devices further comprising a decoder circuit controlling operation of said plurality of switches.

13. The display device of claim 12, wherein said decoder circuit includes:

a dividing circuit for dividing a clock signal drawing the display device; and a logic circuit, receiving outputs from said dividing circuit and said displayed data and outputting control signals for controlling operation of said plurality of switches.

14. The display device of claim 13, wherein said logic circuit includes:

a first plurality of NAND circuits;

a second plurality of NOR circuits; and a third plurality of OR circuits.

15. The display device of claim 14, wherein said first plurality is two times larger than said second plurality and said third plurality equals said second plurality.

16. The display device of claim 15, wherein:

a first NAND circuit said plurality of NAND circuits receives said outputs from said dividing circuit and outputs a result to a first inverter circuit, a second NAND circuit receives an output of said first inverter circuit and a first datum of said displayed data, a third NAND circuit receives one of said outputs from said signal dividing circuit and a second datum of said displayed data, a fourth NAND circuit receives an output from said second NAND circuit and an output from said third NAND circuit, and outputs a result to a second inverter circuit; and a fifth NAND circuit receives said first datum, said second datum and a third datum of said plurality of displayed data.

17. The display device of claim 16, wherein a first NOR circuit receives an output from said fourth NAND circuit and said third datum, and outputs a first signal, a second NOR circuit receives an output from said second inverter and said third datum, and outputs a second signal, a first OR circuit receiving said output from said fourth NAND circuit and an inverted third datum, a second OR circuit receiving said output from said second meter and said inverted third datum, a third OR circuit receiving an output from said fifth NAND circuit and said inverted third datum, a sixth NAND circuit receiving an ??? from said second OR circuit an output from said third OR circuit, a third NOR circuit receiving an output from said first 0R circuit and an output from said sixth NAND circuit, and outputting a third signal, and said sixth NAND circuit outputting a fourth signal.

18. The display device of claim 17, wherein said first, second, third and fourth signals serve as control signals for respective ones of said plurality of switches.

19. The display device of claim 17, wherein, when a drive voltage is variable with each frame of displayed data, said decoder circuit further includes;

a first AND circuit receiving an inverted first datum, an inverted second datum, and said third datum;

a second AND circuit receiving said fourth signal and first frame signal;

a third AND circuit receiving a second frame signal and said first signal;

a first frame OR circuit receiving an output of said second AND circuit and an output of said third AND circuit, and outputting a first control signal;

a fourth AND circuit receiving a conjunction of said first AND signal and said first frame signal, and said third signal;

a fifth AND circuit receiving a sum of said second frame signal and said first signal, and said second signal;

a second frame OR circuit receiving an output from said fourth AND circuit and from said fifth AND circuit, and outputting a second control signal;

a sixth AND circuit receiving said third signal and said sum of said second frame signal and said first AND signal;

a seventh AND circuit receiving said second signal and said conjunction;

a third frame OR circuit receiving an output from said sixth AND circuit and from said seventh AND circuit, and outputting a third signal;

an eight AND circuit receiving said fourth signal and said second frame signal;

a sixth AND circuit receiving said first signal and said first frame signal; and a fourth frame OR circuit receiving an output from said eight AND circuit and from said ninth AND circuit, and outputting a fourth control signal.

20. The display device of claim 13, wherein said dividing circuit includes a plurality n of dividers, and said logic circuit includes:

a first plurality n of NAND circuits receiving an output from a respective divider and a datum from a corresponding one of n displayed data;

a first another NAND circuit receiving each of said n displayed data;

a second another NAND circuit receiving outputs from said first plurality of said NAND circuits;

a plurality of (m−n+1) OR circuits receiving remaining (m−n) displayed data, a first OR circuit receiving each of said (m−n) displayed data, a second through (m−n+1)the OR circuit receiving each datum of said (m−n) displayed data, with a respective one of said datum being inverted;

a second plurality (m−n+1)the NAND circuits, (m−n) NAND circuits of said second plurality receiving each of said (m−n) displayed data, with a respective one of said datum being inverted, an (m−n+1)the NAND circuit receiving outputs from each said (m−n) displayed data;

a plurality (4(m−n+1)) respective pairs of NOR circuits receiving an output from a respective one of said (m−n+1)the OR and NAND circuits, a first NOR circuit of each pair further receiving an output from said second another NAND circuit and a second NOR circuit of each pair further receiving an inverted output from said second another NAND circuit, outputs from a first to a (4(m−n+1)−2)th serving as a first through a (4(m−n+1)−2)th control signal;

a first another NOR circuit receiving an output from said first another NAND circuit;

a third another NAND circuit receiving an output from said first another NAND circuit and a (4(m−n+1))th NOR circuit, said third another NAND circuit outputting a (4(m−n+1))th control signal; and a second another NOR circuit receiving an inverted output from an (4(m−n+1)−1)th NOR circuit and said output of said third another NAND circuit, said second another NOR circuit outputting an (4(m−n+1)−1)th control signal.

* * * * *